(12) United States Patent
Maeda et al.

(10) Patent No.: US 7,195,827 B2
(45) Date of Patent: Mar. 27, 2007

(54) PERPENDICULAR MAGNETIC RECORDING MEDIUM

(75) Inventors: Tomoyuki Maeda, Yokohama (JP);
Akira Kikitsu, Yokohama (JP);
Hiroyuki Hieda, Yokohama (JP);
Yoshiyuki Kamata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 147 days.

(21) Appl. No.: 10/722,599

(22) Filed: Nov. 28, 2003

(65) Prior Publication Data

US 2004/0161638 A1 Aug. 19, 2004

(30) Foreign Application Priority Data

Nov. 28, 2002 (JP) ............................. 2002-346268

(51) Int. Cl.
*G11B 5/66* (2006.01)

(52) U.S. Cl. ................. 428/831; 428/831.2; 428/836.1

(58) Field of Classification Search ..................... None
See application file for complete search history.

(56) References Cited

U.S. PATENT DOCUMENTS

| | | | | |
|---|---|---|---|---|
| 5,989,728 | A * | 11/1999 | Coffey et al. | 428/611 |
| 6,387,483 | B1 * | 5/2002 | Hokkyo et al. | 428/332 |
| 6,428,906 | B1 * | 8/2002 | Wong et al. | 428/611 |
| 6,541,131 | B1 * | 4/2003 | Ristau | 428/826 |
| 6,599,646 | B2 * | 7/2003 | Suzuki et al. | 428/826 |
| 6,645,647 | B1 * | 11/2003 | Litvinov et al. | 428/830 |
| 6,709,773 | B1 * | 3/2004 | Chang et al. | 428/831 |
| 6,777,078 | B2 * | 8/2004 | Maeda et al. | 428/836.1 |
| 2001/0051287 | A1 * | 12/2001 | Kikitsu et al. | 428/694 ML |
| 2003/0113582 | A1 * | 6/2003 | Litvinov et al. | 428/694 T |
| 2004/0191578 | A1 * | 9/2004 | Chen et al. | 428/694 TS |

FOREIGN PATENT DOCUMENTS

| | | |
|---|---|---|
| JP | 11-353648 | 12/1999 |
| JP | 2001-189010 | 7/2001 |
| JP | 2002-42331 | 2/2002 |
| JP | 2002-216330 | 8/2002 |
| JP | 2002-251720 | 9/2002 |

OTHER PUBLICATIONS

Toshio Suzuki, et al., "Sputter-Deposited (Fe-Pt)-MgO Composite Films for Perpendicular Recording Media", IEEE Transactions on Magnetics, vol. 37, No. 4, Jul. 2001, pp. 1283-1285.

* cited by examiner

*Primary Examiner*—Kevin M. Bernatz
(74) *Attorney, Agent, or Firm*—Oblon, Spivak, McClelland, Maier & Neustadt, P.C.

(57) ABSTRACT

A perpendicular magnetic recording medium includes a substrate, an underlayer formed on the substrate, and containing at least one element selected from the group A consisting of Pt, Pd, Rh, Ag, Au, Ir and Fe, and at least one element or compound selected from the group B consisting of C, Ta, Mo, W, Nb, Zr, Hf, V, Mg, Al, Zn, Sn, In, Bi, Pb, Cd, $SiO_2$, MgO, $Al_2O_3$, TaC, TiC, TaN, TiN, $B_2O_3$, $ZrO_2$, $In_2O_3$ and $SnO_2$, and a magnetic layer formed on the underlayer, containing at least one element selected from the group consisting of Fe, Co, and Ni, and at least one element selected from the group consisting of Pt, Pd, Au and Ir, and containing crystal grains having an $L1_0$ structure.

11 Claims, 11 Drawing Sheets

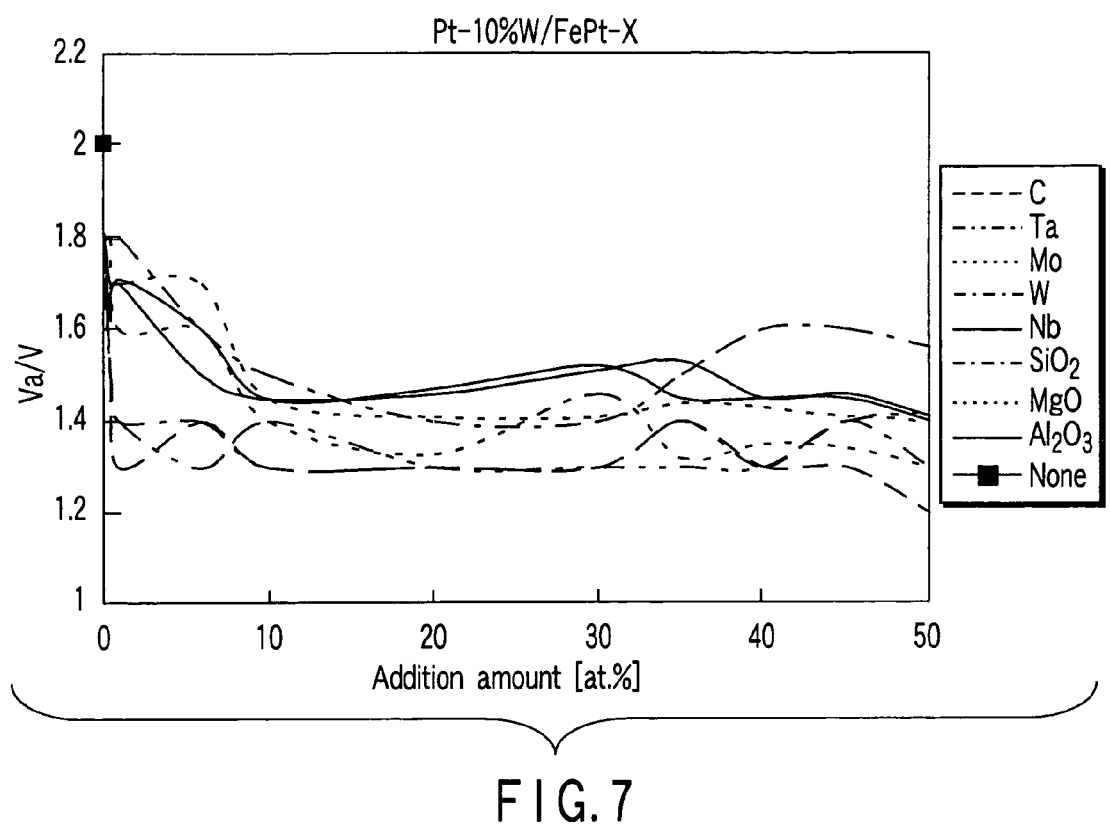
F I G. 7
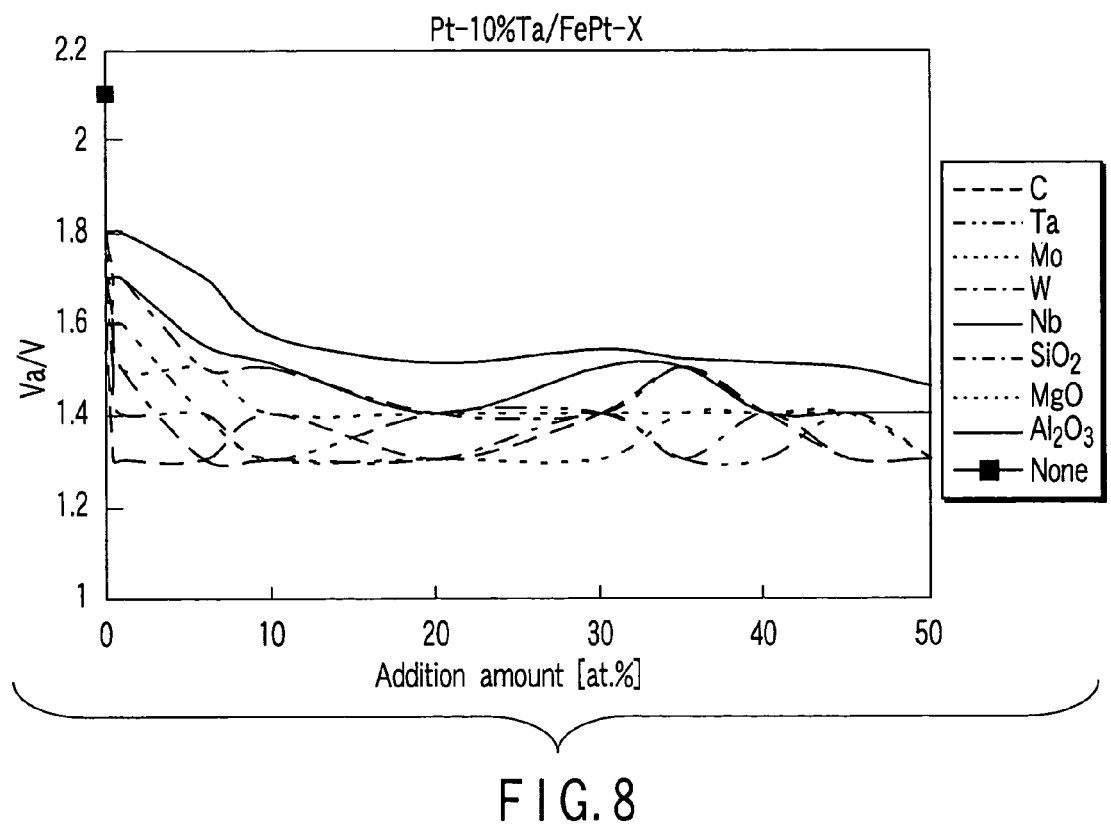
F I G. 8

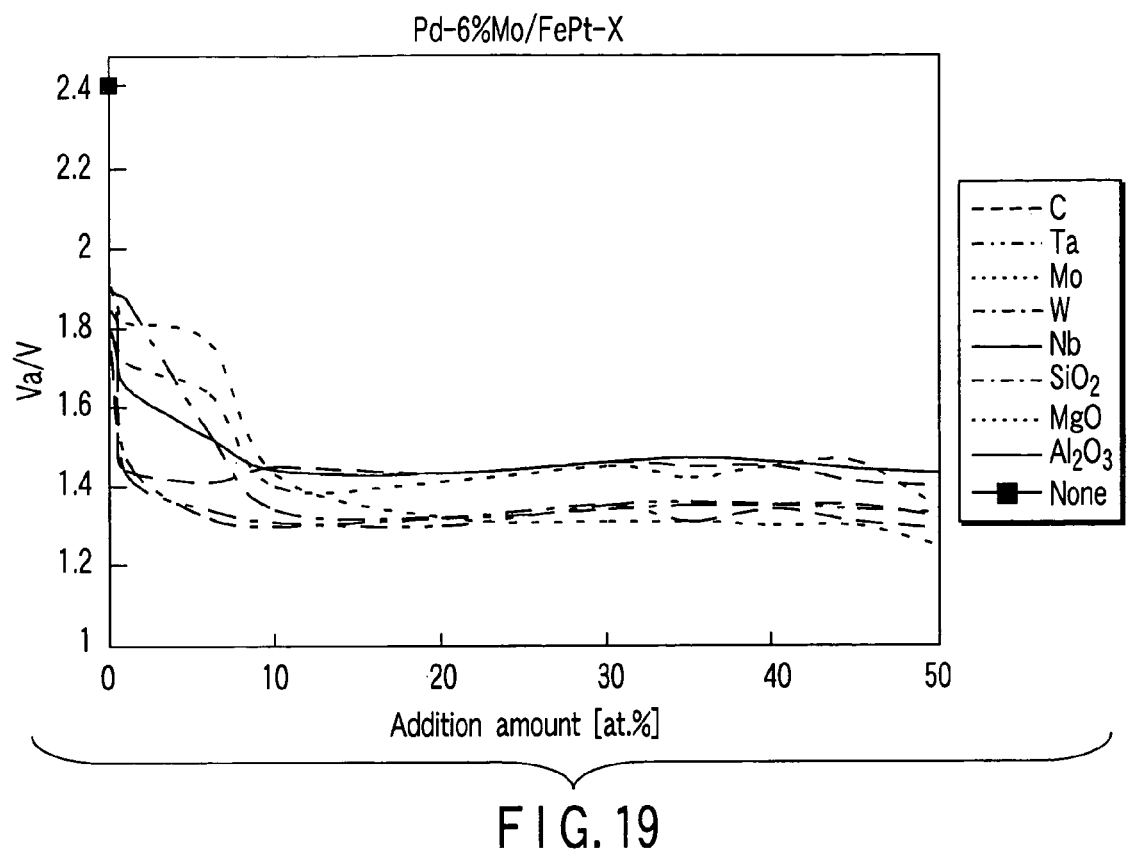
F I G. 19
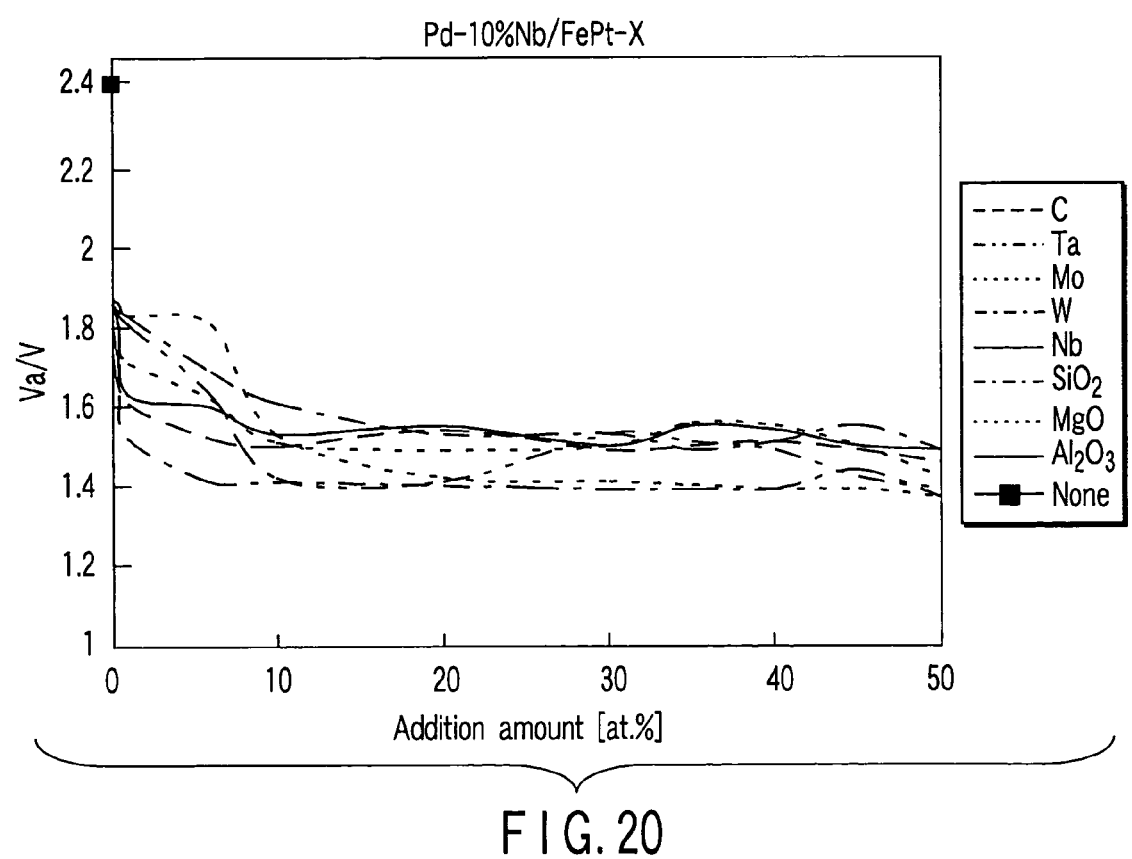
F I G. 20

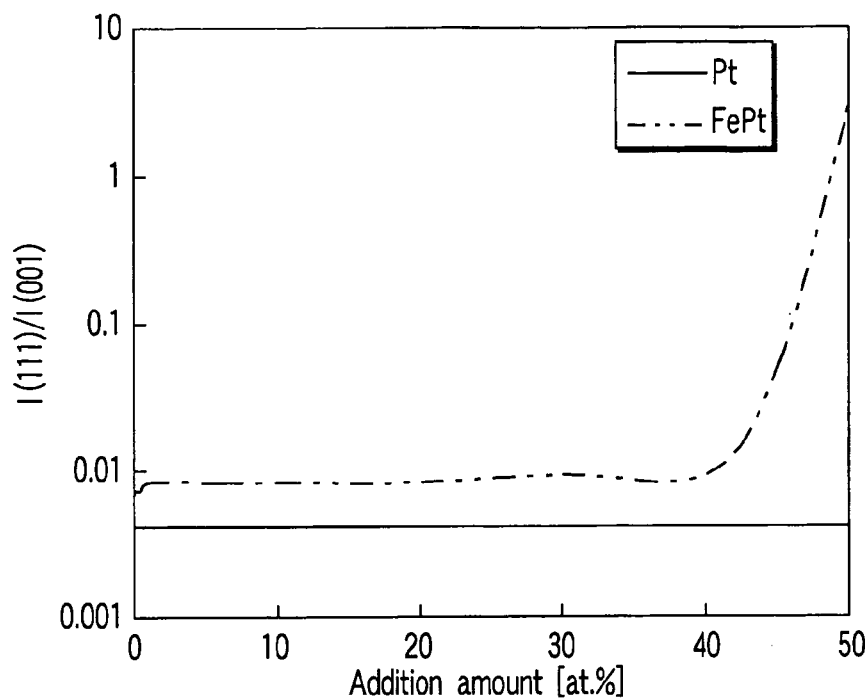
F I G. 21
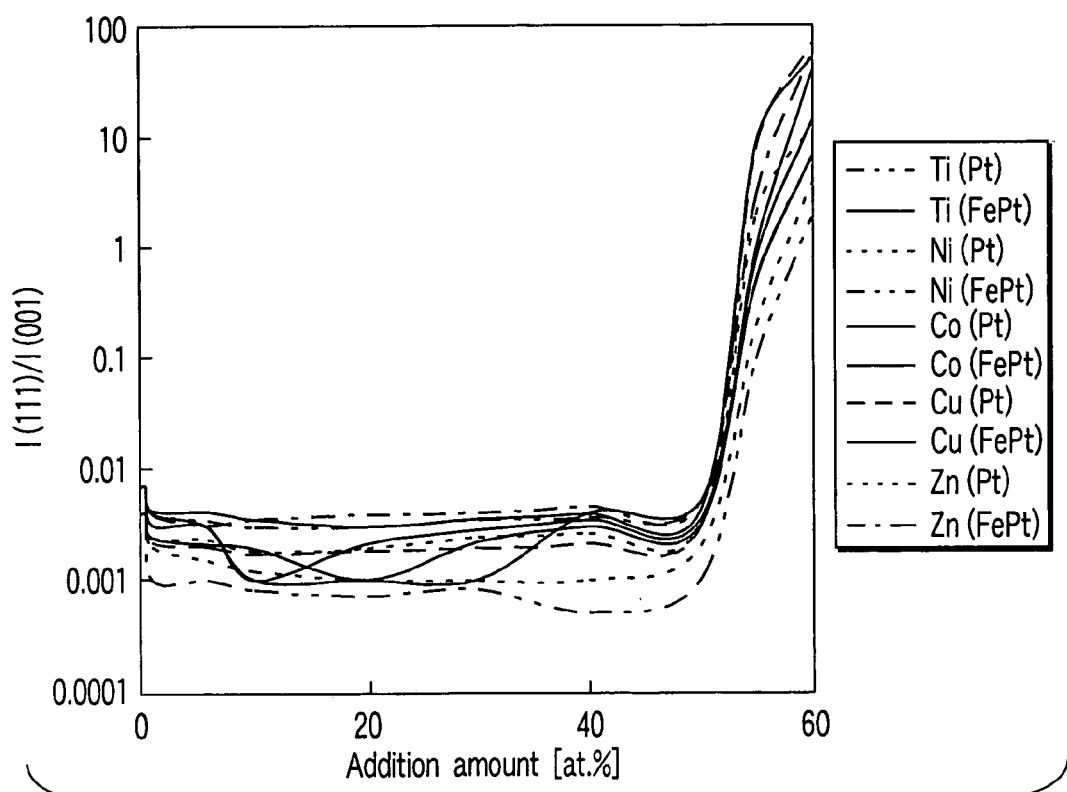
F I G. 22

PERPENDICULAR MAGNETIC RECORDING MEDIUM

CROSS-REFERENCE TO RELATED APPLICATIONS

This application is based upon and claims the benefit of priority from the prior Japanese Patent Application No. 2002-346268, filed Nov. 28, 2002, the entire contents of which are incorporated herein by reference.

BACKGROUND OF THE INVENTION

1. Field of the Invention

The present invention relates to a perpendicular magnetic recording medium including a magnetic film suitable to high-density magnetic recording.

2. Description of the Related Art

With a recent increase in computer's processing speed, a magnetic storage device (HDD) for recording and reproducing information is required to have high speed and high density. The most popular HDD recording system at present is a longitudinal recording system in which magnetization lies in the longitudinal direction of a medium. To further increase the density, however, perpendicular magnetic recording is preferred because a demagnetizing field near the magnetization reversal boundary is small and sharp reversal magnetization is obtained. Also, thermal fluctuation, which is a problem in magnetic recording media in recent years, can be suppressed by the perpendicular medium since the film thickness of perpendicular medium can be made larger than that of longitudinal medium.

Conventionally, CoCr-based disordered alloys such as CoCrPt have been mainly studied as the material of a perpendicular magnetic film. However, since thermal fluctuation can become a future problem even in perpendicular media, a material having higher perpendicular magnetic anisotropy than those of the conventional CoCr-based materials is necessary. As promising candidates of the material, research is being extensively made on an ordered alloy in which an ordered phase is formed by a magnetic material selected from Fe, Co and Ni and a noble metal element selected from Pt, Pd, Au and Ir. In particular, FePt and CoPt as ordered alloys having an $L1_0$ crystal structure have high magnetic anisotropies of $7 \times 10^7$ and $4 \times 10^7$ erg/cc, respectively, in the c-axis direction (<100> direction). Therefore, a perpendicular medium having a high thermal fluctuation resistance can be formed when one of these materials is used for a recording layer. Unfortunately, to use these materials as a perpendicular magnetization film, the c-axis as the easy axis of magnetization must be oriented perpendicularly to the film surface.

The following techniques are conventionally known as methods of forming a c-axis oriented film. For example, Jpn. Pat. Appln. KOKAI Publication No. 2001-189010 discloses a technique in which at least one (100)-oriented underlayer is formed between a substrate and magnetic layer. Also, Jpn. Pat. Appln. KOKAI Publication No. 11-353648 discloses a technique in which a Cr alloy underlayer containing Cr and Ti or the like is formed. Relatively good perpendicular magnetization films are obtained by this technique.

To allow an ordered alloy to achieve high magnetic anisotropy, however, it is generally necessary to be annealed at several hundred degrees during or after film deposition. This annealing increases the size of crystal grains and hence increases the magnetic cluster size, thereby making it difficult to improve recording resolution.

Accordingly, to realize a high-density perpendicular magnetic recording medium using an ordered alloy as a recording layer, it is necessary to decrease the magnetic cluster size by decreasing the crystal grain size or magnetically isolating the crystal grains in the recording layer, in addition to improving the c-axis orientation.

To magnetically isolate the crystal grains in an ordered alloy, an attempt to add a nonmagnetic element such as MgO to an ordered alloy magnetic layer has been disclosed in, for example, IEEE Transactions on Magnetics, vol. 37, No. 4, pp. 1283–1285. However, this technique is not enough to magnetically isolate magnetic grains. In addition, to order this ordered alloy, annealing at 500° C. or more after film deposition or substrate heating during film deposition is necessitated, which lowers productivity.

BRIEF SUMMARY OF THE INVENTION

It is an object of the present invention to provide a high-density perpendicular magnetic recording medium capable of providing high recording resolution by magnetically isolating magnetic grains in a magnetic film, and having high productivity and high thermal fluctuation resistance.

A magnetic recording medium according to an aspect of the present invention comprises a substrate; an underlayer formed on the substrate, and containing at least one element selected from the group A consisting of Pt, Pd, Rh, Ag, Au, Ir and Fe, and at least one element or compound selected from the group B consisting of C, Ta, Mo, W, Nb, Zr, Hf, V, Mg, Al, Zn, Sn, In, Bi, Pb, Cd, $SiO_2$, MgO, $Al_2O_3$, TaC, TiC, TaN, TiN, $B_2O_3$, $ZrO_2$, $In_2O_3$ and $SnO_2$; and a magnetic layer formed on the underlayer, containing at least one element selected from the group consisting of Fe, Co and Ni, and at least one element selected from the group consisting of Pt, Pd, Au and Ir, and containing crystal grains having an $L1_0$ structure.

BRIEF DESCRIPTION OF THE SEVERAL VIEWS OF THE DRAWING

FIG. 7 is a graph showing the relationship between the addition amount of each group B element or compound to a magnetic layer and $V_d/V$ in magnetic recording media according to the present invention;

FIG. 8 is a graph showing the relationship between the addition amount of each group B element or compound to a magnetic layer and $V_d/V$ in magnetic recording media according to the present invention;

FIG. 19 is a graph showing the relationship between the addition amount of each group B element or compound to a magnetic layer and $V_d/V$ in magnetic recording media according to the present invention;

FIG. 20 is a graph showing the relationship between the addition amount of each group B element or compound to a magnetic layer and $V_d/V$ in magnetic recording media according to the present invention;

FIG. 21 is a graph showing the relationship between the addition amount of a group B element or compound to a recording layer, $I_{FePt(111)}/I_{FePt(001)}$, and $I_{Pt(111)}/I_{Pt(100)}$ in magnetic recording media according to the present invention; and FIG. 22 is a graph showing the relationship between the addition amount of each group C element to a crystal orientation layer, $I_{FePt(111)}/I_{FePt(001)}$, and $I_{Pt(111)}/I_{Pt(100)}$ in magnetic recording media according to the present invention.

DETAILED DESCRIPTION OF THE INVENTION

Embodiments of the present invention will be described below.

Figure 1:
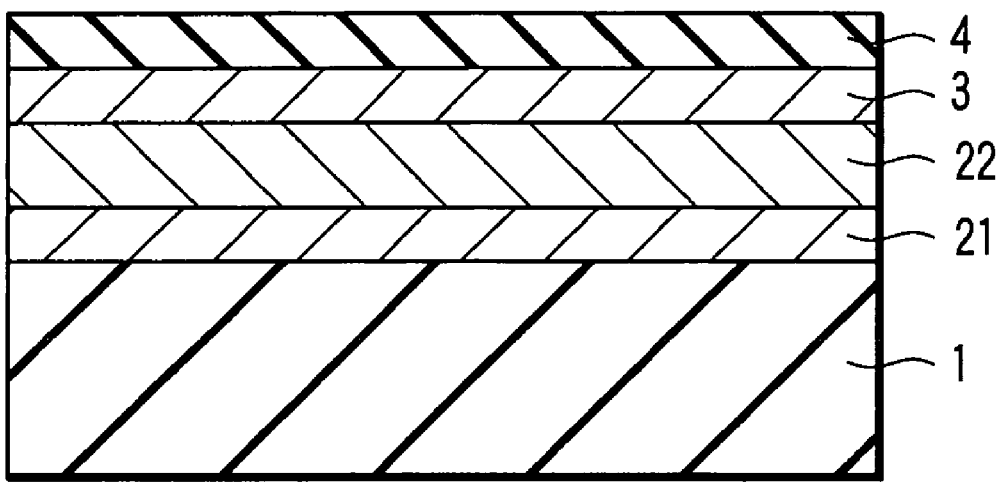
FIG. 1 is a sectional view of a magnetic recording medium according to an embodiment of the present invention.

FIG. 1 is a sectional view of a magnetic recording medium according to an embodiment of the present invention. The magnetic recording medium shown in FIG. 1 has a structure in which the seed layer 21, the underlayer 22, the magnetic layer 3, and the protective layer 4 are formed on the substrate 1.

Figure 2:
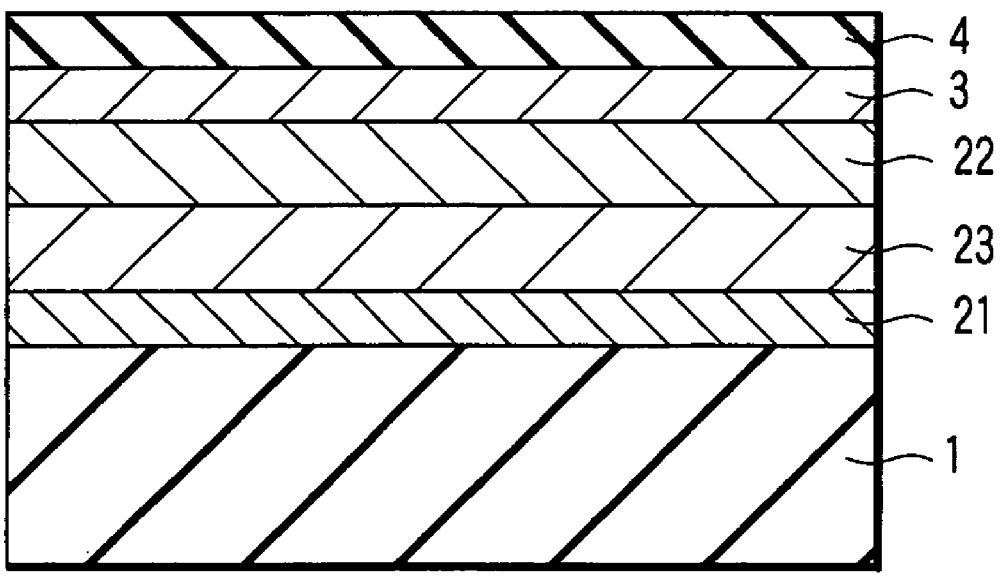
FIG. 2 is a sectional view of a magnetic recording medium according to another embodiment of the present invention.

FIG. 2 is a sectional view of a magnetic recording medium according to another embodiment of the present invention. The magnetic recording medium shown in FIG. 2 has a structure in which the seed layer 21, the crystal orientation layer 23, the underlayer 22, the magnetic layer 3, and the protective layer 4 are formed on the substrate 1.

Note that the seed layer 21 and the crystal orientation layer 23 shown in FIGS. 1 and 2 can be regarded as underlayers in a broad sense. Under the circumstances, the stacking order of the seed layer 21, the crystal orientation layer 23, and the underlayer 22 (i.e., the underlayer in the narrow sense having a specific composition defined in the present invention) is not particularly limited.

In the embodiments of the present invention, an amorphous material or a polycrystalline material such as glass or ceramics is used as a substrate. It is also possible to use a substrate obtained by depositing, e.g., a metal or ceramics on a substrate main body made of a hard material. In addition, a single-crystal substrate such as a Si, MgO, or $Al_2O_3$ substrate can be used.

In the embodiments of the present invention, thin films, i.e., an underlayer and a magnetic layer are formed on the substrate. As a method for depositing a thin film, it is possible to use vacuum evaporation, sputtering, chemical vapor deposition, or laser ablation. Heating the substrate to a temperature of 200 to 500° C. during deposition of the underlayer and/or the magnetic layer is sometimes desirable because ordering of the magnetic layer progresses. Instead of heating the substrate, it is also possible to perform bias sputtering in which RF and/or DC power is applied to the substrate, or irradiation of the substrate with ions or neutral particles. These processes can be performed not only during film deposition but also after or before the film deposition.

In the embodiments of the present invention, the magnetic layer contains crystal grains having an $L1_0$ structure comprising a magnetic metal element and a noble metal element as main components. The magnetic metal element is at least one element selected from the group consisting of Fe, Co and Ni, and the noble metal element is at least one element selected from the group consisting of Pt, Pd, Au and Ir. As this magnetic layer, a stacked structure of two or more magnetic layers having different characteristics can also be used. In this structure, one or both of exchange coupling interaction and magnetostatic coupling interaction can act between the stacked magnetic layers. Also, one or more nonmagnetic layers can be arranged between the two or more magnetic layers. Such a construction of the magnetic layer is chosen dependent on the magnetic characteristics required by the system or the manufacturing process.

Whether the crystal grains forming the magnetic layer have the $L1_0$ structure or not can be checked by a general X-ray diffractometer. More specifically, the $L1_0$ structure exists if a peak indicating a (001)- or (003)-plane is observed at an angle of diffraction matching the corresponding lattice spacing. These peaks cannot be observed in a disordered face-centered cubic lattice. The intensity of the peak indicating the (001)- or (003)-plane is satisfactory if it is observed as a significantly higher peak with respect to the background level. Also, even when a peak indicating another orientation plane such as (111) is observed, the c-axis is estimated to be oriented perpendicularly to the film surface if the peak indicating the (001)-plane is observed at higher intensity (i.e., intensity 100 times that of the other peak or higher.)

Note that, if the magnetic grain size decreases to about 10 nm and the crystal lattice coherency between adjacent magnetic grains is small, the structure sometimes looks amorphous from the result of X-ray diffraction even when the c-axis is oriented perpendicularly to the film surface. In such a case, the perpendicular orientation of the c-axis to the film surface can be checked by microstructure observation with a transmission electron microscope (TEM) or the like.

The thickness of the magnetic layer is determined by the requirement of the system. Generally, this thickness is preferably 200 nm or less, and more preferably, 50 nm or less. However, a thickness smaller than 0.5 nm is unsuitable for a magnetic recording medium because a continuous film is hard to be formed.

In the embodiments of the present invention, the underlayer reinforces the function of the magnetic layer in a magnetic recording medium. This underlayer can be formed as either a single layer film or a multilayered film.

The underlayer is made of a material mainly containing at least one element selected from the group A consisting of Pt, Pd, Rh, Ag, Au, Ir and Fe to which at least one element or compound selected from the group B consisting of C, Ta, Mo, W, Nb, Zr, Hf, V, Mg, Al, Zn, Sn, In, Bi, Pb, Cd, $SiO_2$, MgO, $Al_2O_3$, TaC, TiC, TaN, TiN, $B_2O_3$, $ZrO_2$, $In_2O_3$ and $SnO_2$ is added.

At least one element selected from Pt, Pd, Rh, Ag, Au, Ir, Fe and Cr (the group A) as the main component of the underlayer or an alloy formed by these elements has a lattice constant close to that of the magnetic layer having an $L1_0$ structure. Therefore, (100)-orientation of the crystal grains in the underlayer permits to improve the c-axis orientation of the magnetic crystals of the $L1_0$ structure, making it possible to provide an excellent perpendicular magnetization film. The functions of the element or compound of the group B added to the group A element will be explained below. In the following explanation, the group B elements and compounds are classified into (1) additive elements having a high-melting point, (2) additive elements having a low melting point, and (3) compounds.

(1) In an underlayer in which at least one additive element having a relatively higher melting point is added to the group A element, the crystal grain size can be reduced. As a consequence, the crystal grain size in the magnetic layer having the $L1_0$ structure can also be reduced. When the group A element and the high-melting point additive element are simultaneously deposited, the composition of the group A element and the additive element is uniform in a vapor phase. Then, these elements are condensed from the vapor phase to a solid phase on the substrate or on the film surface. At this stage, nuclei relatively high in the concentration of the high-melting point additive element are first formed dispersedly. After that, a matrix relatively high in the concentration of the group A element having a lower melting point is sequentially condensed so as to surround the nuclei. Consequently, the underlayer grows to be an inhomogeneous texture made up of a large number of columnar clusters in which the group A atoms are concentrically condensed around cores of the two-dimensionally dispersed nuclei. When such an underlayer is inserted between the substrate and the magnetic layer, the magnetic layer becomes a two-dimensionally isolated structure with reflecting the texture of the underlayer. Since the main component of the underlayer is the group A element, the lattice matching between the clusters and the magnetic crystal grains does not degrade. Therefore, it is possible to reduce the crystal grain size and to isolate the crystal grains while the c-axis orientation of the magnetic crystal having the $L1_0$ structure is maintained. Of the group B elements added to the group A element, C, Ta, Mo, W, Nb, Zr, Hf, and V are preferable as the additive element having a high-melting point.

(2) In an underlayer in which at least one additive element having a relatively lower melting point is added to the group A element, the crystal grain size can be reduced. As a consequence, the crystal grain size in the magnetic layer having the $L1_0$ structure can also be reduced. When the group A element and the low-melting additive element are simultaneously deposited, the composition of the group A element and the additive element is uniform in a vapor phase. Then, these elements are condensed from the vapor phase to a solid phase on the substrate or on the film surface. At this stage, a core relatively high in the concentration of the group A element having a relatively higher melting point are first condensed. After that, atoms of the low-melting point additive element are condensed mainly along the grain boundaries so as to surround the core. Consequently, the underlayer grows to be a structure formed of crystal grains of the group A element and the precipitates of the low-melting additive element in the grain boundaries. When such an underlayer is inserted between the substrate and the magnetic layer, the magnetic layer becomes a two-dimensionally isolated structure with reflecting the texture of the underlayer. Since the main component of the underlayer is the group A element, the lattice matching between the grains and the magnetic crystal grains does not degrade. Therefore, it is possible to reduce the crystal grain size and to isolate the crystal grains while the c-axis orientation of the magnetic crystal having the $L1_0$ structure is maintained. Of the group B elements added to the group A element, Mg, Al, Zn, Sn, In, Bi, Pb, and Cd are preferable as the low-melting additive element.

(3) In an underlayer in which at least one compound selected from $SiO_2$, MgO, $Al_2O_3$, TaC, TiC, TaN, TiN, $B_2O_3$, $ZrO_2$, $In_2O_3$ and $SnO_2$ is added to a group A element, the crystal grain size can be reduced. As a consequence, the crystal grain size in the magnetic layer having the $L1_0$ structure can also be reduced. Since the solid solubility limit of the above compound with respect to the group A element is very small, the compound rarely forms another compound with the group A element but causes phase separation. Therefore, when the compound and the group A element are simultaneously deposited, the underlayer grows to be a structure formed of crystal grains of the group A element and the precipitates of the compound at the grain boundaries. S When such an underlayer is inserted between the substrate and magnetic layer, the magnetic layer becomes a two-dimensionally isolated structure with reflecting the texture of the underlayer. Since the main component of the underlayer is the group A element, the lattice matching between the grains and the magnetic crystal grains does not degrade. Accordingly, it is possible to reduce the crystal grain size and to isolate the crystal grains while the c-axis orientation of the magnetic crystal having the $L1_0$ structure is maintained.

In the embodiments of the present invention, it is preferable that the crystal grains of the $L1_0$ structure in the magnetic layer are (001)-oriented, and the crystal grains in the underlayer mainly containing the group A element are (100)-oriented. In a perpendicular magnetic recording medium, the magnetic crystal grains preferably have the L1$_0$ structure in which the c-axis is oriented in the direction perpendicular to the film surface. However, not all grains need to satisfy this condition. The ratio of grains having the L1$_0$ structure is preferably 60% or more, and more preferably, 80% or more.

In the embodiments of the present invention, the total molar fraction of the group B element or compound added to the group A element in the underlayer is preferably 0.1 to 50 mol %. If the molar fraction is less than 0.1 mol %, an addition effect does not appear significantly. If the molar fraction is larger than 50 mol %, the lattice matching with the magnetic layer degrades, which deteriorates the c-axis orientation.

In the embodiments of the present invention, at least one element or compound selected from the group B can be added to the magnetic layer as well as the underlayer. In this case, a similar texture to that in the underlayer is formed even in the deposition process of the magnetic layer, so that the magnetic clusters or magnetic crystal grains finer than those in the underlayer can be formed. The total molar fraction of the group B element or compound added to the magnetic layer is preferably 0.1 to 40 mol %. If the molar fraction is less than 0.1 mol %, an addition effect does not appear significantly. If the molar fraction is larger than 40 mol %, the lattice matching between the magnetic layer and underlayer degrades, which deteriorates the c-axis orientation.

In addition to the group B element or compound, Cu or the like can also be added to the magnetic layer. When only Cu is added to the magnetic layer, the effect of magnetically isolating the grains as described above cannot be obtained. However, as disclosed in Applied Physics Letters, volume 80, number 12, pp. 2147–2149, the annealing temperature required for ordering can be reduced.

In the embodiments of the present invention, a crystal orientation layer, containing Cr as a main component and at least one element selected from the group C consisting of Ti, Ni, Cu, Co and Zr to be added to Cr, can also be formed between the underlayer mainly containing the group A element and the substrate. Insertion of the crystal orientation layer mainly containing Cr improves the (100)-orientation of the underlayer mainly containing the group A element, and also improves the (001)-orientation of the magnetic layer. Accordingly, the easy axis of magnetization of the magnetic layer is advantageously oriented in the direction perpendicular to the substrate, so that more preferable characteristics as a perpendicular magnetic recording medium can be provided. The total molar fraction of the group C element added to the crystal orientation layer is preferably 1 to 50 mol %. If the molar fraction is less than 1 mol %, an addition effect does not appear significantly. If the molar fraction is larger than 50 mol %, no effect of improving orientation can be obtained.

EXAMPLES

Examples of the present invention will be described below.

In the following examples, to evaluate the degree of magnetic isolation between magnetic grains forming a magnetic layer, a $V_a/V$ ratio was evaluated. Here, $V_a$ is an activation volume of magnetization reversal and V is a crystal grain volume. The smaller the value of $V_a/V$, the better the magnetic isolation.

The crystal grain volume V of a medium was measured with a transmission electron microscope (TEM). The following method was used to obtain an activation magnetic moment $V_aI_{sB}$ ($V_a$: activation volume, $I_{sB}$: bulk saturation magnetization) from measurement by a vibrating sample magnetometer (VSM).

A remanence coercivity Hc$_r$ is represented by $$Hc_r(t)=H_0(1-(ln(f_0t)/\beta)^{0.5}),$$

where t is a period when a magnetic field is applied, H$_0$ is a coercivity at time zero, f$_0$ is a frequency factor (10$^9$ sec), $\beta$=KuV$_a$/k$_B$T, Ku is magnetic anisotropy energy density, k$_B$ is a Boltzmann constant, and T is an absolute temperature. If H$_0$ meets H$_0$=2Ku/I$_{sB}$, then V$_a$I$_{sB}$=$\beta$×(2k$_B$T)/H$_0$.

Therefore, V$_a$I$_{sB}$ can be calculated by obtaining $\beta$ and H$_0$ by fitting with respect to various t values.

To adapt normal VSM measurement results to this method, coercivity values were measured by changing a sweep rate t$_{swp}$, and the resultant coercivity values Hc(t$_{swp}$) were converted into remanence coercivity values Hc$_r$(t). This conversion was performed by solving an equation disclosed in a reference (M. P. Sharrock: IEEE Trans. Magn. 35 p. 4414 (1999)) in a self-consistent manner. The activation volume V$_a$ was calculated by assuming that I$_{sB}$ was 800 emu/cc in the resultant V$_a$I$_{sB}$ value.

In the examples, the state of magnetic isolation was evaluated by classifying the value of V$_a$/V into the following six grades.

Evaluation: V$_a$/V
- A: 1.0 or more, and less than 2.0
- B: 2.0 or more, and less than 2.5
- C: 2.5 or more, and less than 3.0
- D: 3.0 or more, and less than 3.5
- E: 3.5 or more, and less than 5.0
- F: 5.0 or more Example 1

In this example, a magnetic recording medium shown in FIG. 1 was fabricated.

A glass disk substrate was used as a substrate 1, and an NiAl layer about 10 nm thick was formed as a seed layer 21.

An underlayer 22 was formed to have a thickness of about 20 nm by using a material comprising Pt, Pd, Rh, Ag, Au, Ir or Fe of a group A element as a matrix material and 0 to 60 mol % of C, Ta, Mo, W, Nb, Zr, Hf, V, Mg, Al, Zn, Sn, In, Bi, Pb, Cd, SiO$_2$, MgO, Al$_2$O$_3$, TaC, TiC, TaN, TiN, B$_2$O$_3$, ZrO$_2$, In$_2$O$_3$ or SnO$_2$ of a group B element or compound added to the matrix material.

An FePt layer about 10 nm thick was formed as a magnetic layer 3, and a carbon layer about 10 nm thick was formed as a protective layer 4.

The magnetic recording medium of this example was fabricated by the following method. A vacuum chamber of a sputtering apparatus was evacuated to 2×10$^{-5}$ Pa or less, and then film deposition was performed under an Ar atmosphere at 5 Pa. During the film deposition, the substrate was heated to 300° C. by an infrared heater. To deposit the seed layer 21, the magnetic layer 3 and the protective layer 4, Ni$_{50}$Al$_{50}$, Fe$_{50}$Pt$_{50}$ and C were used as targets, respectively. To deposit the underlayer 22, a composite target of the group A element and group B element or compound was used. The composition of the group B element or compound was adjusted by changing the composition of the target. The applied power to each target was set to 100 W, and the films were deposited through DC or RF magnetron sputtering.

Tables 1 and 2 show the results of media each having an underlayer containing only a group A element (no group B element or compound was added), and media each having an underlayer in which the amount of a group B element or compound was set to 10 mol % with respect to a group A element.

As shown in Tables 1 and 2, each medium having an underlayer containing only a group A element (no group B element or compound was added) had a high $V_d/V$ value (classification F), indicating a small degree of magnetic isolation between the magnetic grains in the magnetic layer. In contrast, each medium having an underlayer in which 10

TABLE 1

| Group A | Group B | Evaluation | Group A | Group B | Evaluation | Group A | Group B | Evaluation |
|---|---|---|---|---|---|---|---|---|
| Pt | None | F | Pd | None | F | Rh | None | F |
| Pt | C | B | Pd | C | B | Rh | C | D |
| Pt | Ta | B | Pd | Ta | B | Rh | Ta | D |
| Pt | Mo | B | Pd | Mo | B | Rh | Mo | D |
| Pt | W | B | Pd | W | B | Rh | W | D |
| Pt | Nb | B | Pd | Nb | B | Rh | Nb | D |
| Pt | Zr | C | Pd | Zr | D | Rh | Zr | E |
| Pt | Hf | C | Pd | Hf | C | Rh | Hf | E |
| Pt | V | C | Pd | V | C | Rh | V | E |
| Pt | Mg | C | Pd | Mg | C | Rh | Mg | D |
| Pt | Al | C | Pd | Al | C | Rh | Al | D |
| Pt | Zn | C | Pd | Zn | D | Rh | Zn | D |
| Pt | Sn | D | Pd | Sn | D | Rh | Sn | E |
| Pt | In | D | Pd | In | D | Rh | In | E |
| Pt | Bi | D | Pd | Bi | D | Rh | Bi | E |
| Pt | Pb | D | Pd | Pb | D | Rh | Pb | E |
| Pt | Cd | D | Pd | Cd | D | Rh | Cd | E |
| Pt | $SiO_2$ | B | Pd | $SiO_2$ | B | Rh | $SiO_2$ | D |
| Pt | MgO | B | Pd | MgO | B | Rh | MgO | D |
| Pt | $Al_2O_3$ | B | Pd | $Al_2O_3$ | D | Rh | $Al_2O_3$ | D |
| Pt | TaC | D | Pd | TaC | D | Rh | TaC | E |
| Pt | TaN | D | Pd | TaN | D | Rh | TaN | E |
| Pt | TiN | D | Pd | TiN | D | Rh | TiN | E |
| Pt | $B_2O_3$ | D | Pd | $B_2O_3$ | D | Rh | $B_2O_3$ | E |
| Pt | $ZrO_2$ | D | Pd | $ZrO_2$ | D | Rh | $ZrO_2$ | E |
| Pt | $In_2O_3$ | D | Pd | $In_2O_3$ | D | Rh | $In_2O_3$ | E |
| Pt | $SnO_2$ | D | Pd | $SnO_2$ | D | Rh | $SnO_2$ | E |

TABLE 2

| Group A | Group B | Evaluation | Group A | Group B | Evaluation | Group A | Group B | Evaluation | Group A | Group B | Evaluation |
|---|---|---|---|---|---|---|---|---|---|---|---|
| Ag | None | F | Au | None | F | Ir | None | F | Fe | None | F |
| Ag | C | D | Au | C | D | Ir | C | D | Fe | C | D |
| Ag | Ta | D | Au | Ta | D | Ir | Ta | D | Fe | Ta | D |
| Ag | Mo | D | Au | Mo | D | Ir | Mo | D | Fe | Mo | D |
| Ag | W | D | Au | W | D | Ir | W | D | Fe | W | D |
| Ag | Nb | D | Au | Nb | D | Ir | Nb | E | Fe | Nb | D |
| Ag | Zr | D | Au | Zr | D | Ir | Zr | E | Fe | Zr | D |
| Ag | Hf | D | Au | Hf | D | Ir | Hf | E | Fe | Hf | D |
| Ag | V | D | Au | V | D | Ir | V | E | Fe | V | D |
| Ag | Mg | D | Au | Mg | D | Ir | Mg | D | Fe | Mg | D |
| Ag | Al | D | Au | Al | D | Ir | Al | D | Fe | Al | D |
| Ag | Zn | D | Au | Zn | E | Ir | Zn | D | Fe | Zn | D |
| Ag | Sn | E | Au | Sn | E | Ir | Sn | E | Fe | Sn | D |
| Ag | In | E | Au | In | E | Ir | In | E | Fe | In | E |
| Ag | Bi | E | Au | Bi | E | Ir | Bi | E | Fe | Bi | E |
| Ag | Pb | E | Au | Pb | E | Ir | Pb | E | Fe | Pb | E |
| Ag | Cd | E | Au | Cd | E | Ir | Cd | E | Fe | Cd | E |
| Ag | $SiO_2$ | D | Au | $SiO_2$ | D | Ir | $SiO_2$ | D | Fe | $SiO_2$ | D |
| Ag | MgO | D | Au | MgO | D | Ir | MgO | D | Fe | MgO | D |
| Ag | $Al_2O_3$ | D | Au | $Al_2O_3$ | D | Ir | $Al_2O_3$ | D | Fe | $Al_2O_3$ | D |
| Ag | TaC | D | Au | TaC | D | Ir | TaC | D | Fe | TaC | D |
| Ag | TaN | D | Au | TaN | D | Ir | TaN | D | Fe | TaN | D |
| Ag | TiN | D | Au | TiN | E | Ir | TiN | D | Fe | TiN | D |
| Ag | $B_2O_3$ | E | Au | $B_2O_3$ | E | Ir | $B_2O_3$ | D | Fe | $B_2O_3$ | D |
| Ag | $ZrO_2$ | E | Au | $ZrO_2$ | E | Ir | $ZrO_2$ | D | Fe | $ZrO_2$ | E |
| Ag | $In_2O_3$ | E | Au | $In_2O_3$ | E | Ir | $In_2O_3$ | E | Fe | $In_2O_3$ | E |
| Ag | $SnO_2$ | E | Au | $SnO_2$ | E | Ir | $SnO_2$ | E | Fe | $SnO_2$ | E | mol % of a group B element or compound was added to a group A element had a low $V_a/V$ value, indicating that magnetic isolation between the magnetic grains was improved.

Figure 3:
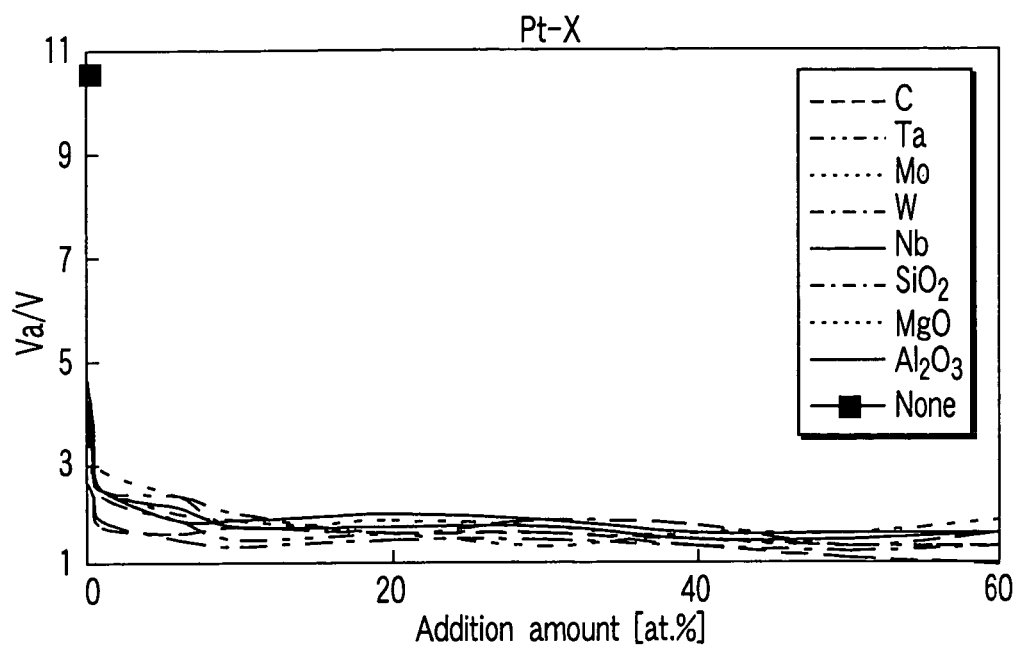
FIG. 3 is a graph showing the relationship between the addition amount of each group B element or compound to an underlayer and $V_d/V$ in magnetic recording media according to the present invention.
Figure 4:
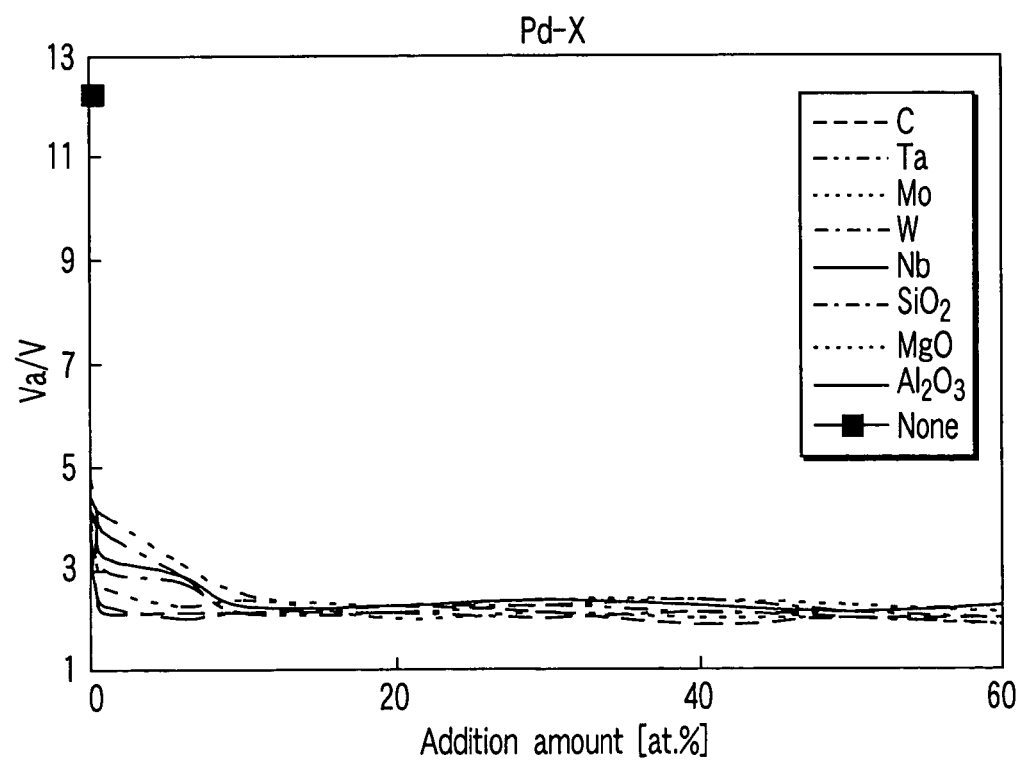
FIG. 4 is a graph showing the relationship between the addition amount of each group B element or compound to an underlayer and $V_d/V$ in magnetic recording media according to the present invention.

FIG. 3 and Table 3 show the relationship between the amount of group B element or compound and $V_a/V$ for a medium having an underlayer represented by Pt—X (X is a group B element or compound). FIG. 4 and Table 4 show the relationship between the amount of group B element or compound and $V_a/V$ for a medium having an underlayer represented by Pd—X (X is a group B element or compound).

In each medium using Pt—X or Pd—X as an underlayer, the $V_a/V$ value significantly reduced when the addition amount of a group B element or compound was 0.1 mol % or more, indicating a remarkable effect on magnetic isolation between the magnetic grains forming the magnetic layer.

TABLE 3

Relationship between amount of X element to Pt—X underlayer and $V_a/V$

| Addition amount | C | Ta | Mo | W | Nb | SiO$_2$ | MgO | Al$_2$O$_3$ | None |
|---|---|---|---|---|---|---|---|---|---|
| 0 | | | | | | | | | 10.3 |
| 0.1 | 3 | 3.8 | 3.6 | 3 | 4.3 | 4.2 | 4 | 4.6 | |
| 0.5 | 2.8 | 3.5 | 3.6 | 2.8 | 3.4 | 3.6 | 3 | 3.9 | |
| 1 | 2.3 | 2.8 | 3.2 | 2.4 | 2.9 | 2.9 | 2.9 | 2.9 | |
| 6 | 2.2 | 2.4 | 2.8 | 2.1 | 2.4 | 2.8 | 2.5 | 2.6 | |
| 10 | 2.3 | 2.1 | 2.3 | 2 | 2.4 | 2.5 | 2.4 | 2.3 | |
| 20 | 2.2 | 2.2 | 2.4 | 2.1 | 2.5 | 2.2 | 2.2 | 2.3 | |
| 30 | 2.2 | 2.2 | 2.3 | 2.1 | 2.4 | 2.4 | 2 | 2.3 | |
| 40 | 2 | 2.1 | 2.1 | 2 | 2.2 | 2.32 | 2.2 | 2.1 | |
| 50 | 1.8 | 2 | 2 | 1.9 | 2.2 | 2 | 2.2 | 2.1 | |
| 60 | 1.7 | 2 | 2 | 2 | 2.2 | 2.2 | 2.4 | 2.2 | |

TABLE 4

Relationship between amount of X element to Pd—X underlayer and $V_a/V$

| Addition amount | C | Ta | Mo | W | Nb | SiO$_2$ | MgO | None |
|---|---|---|---|---|---|---|---|---|
| 0 | | | | | | | | 12.2 |
| 0.1 | 3.6 | 4 | 3.8 | 3.2 | 3.9 | 4.2 | 4.5 | |
| 0.5 | 2.6 | 3.8 | 3.1 | 2.6 | 3.7 | 4 | 4 | |
| 1 | 2.3 | 3 | 2.7 | 2.4 | 3.2 | 3.6 | 3.9 | |
| 6 | 2.3 | 2.8 | 2.4 | 2.2 | 2.9 | 2.9 | 3.1 | |
| 10 | 2.3 | 2.3 | 2.5 | 2.3 | 2.4 | 2.3 | 2.6 | |
| 20 | 2.4 | 2.3 | 2.4 | 2.3 | 2.4 | 2.4 | 2.2 | |
| 30 | 2.3 | 2.4 | 2.5 | 2.2 | 2.5 | 2.4 | 2.3 | |
| 40 | 2.1 | 2.3 | 2.5 | 2.3 | 2.4 | 2.5 | 2.2 | |
| 50 | 2.2 | 2.3 | 2.4 | 2.2 | 2.3 | 2.3 | 2.2 | |
| 60 | 2.2 | 2.4 | 2.3 | 2.1 | 2.4 | 2.2 | 2.1 | |

Figure 5:
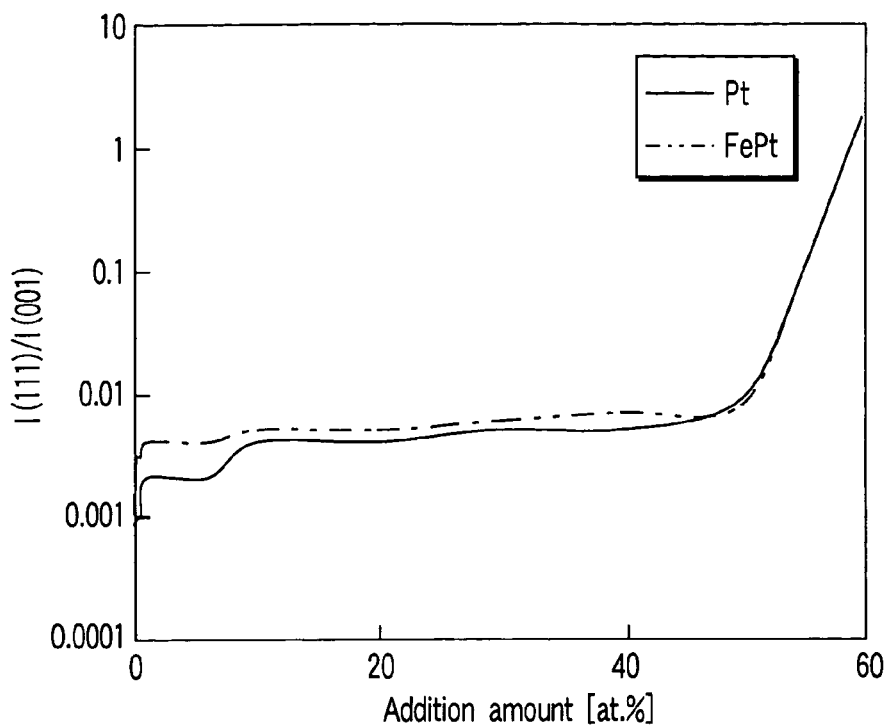
FIG. 5 is a graph showing the relationship between the addition amount of a group B element or compound to an underlayer, $I_{FePt(111)}/I_{FePt(001)}$, and $I_{Pt(111)}/I_{Pt(100)}$ in magnetic recording media according to the present invention.

The XRD profile of a medium having a PtTa underlayer was measured to obtain (111) reflection and (001) reflection of each of FePt and Pt, thereby calculating integrated intensity ratios $I_{FePt(111)}/I_{FePt(001)}$ and $I_{Pt(111)}/I_{Pt(100)}$. FIG. 5 and Table 5 show the relationships between the amount of Ta to the PtTa underlayer and the integrated intensity ratios.

As is apparent from FIG. 5 and Table 5, the integrated intensity ratio of each of FePt and Pt abruptly increased and the perpendicular orientation deteriorated when the Ta amount to the underlayer exceeded 50 mol %. The same tendency was found in a medium using an underlayer made of a combination of another matrix material and an additive element.

TABLE 5

Relationship between Ta amount to PtTa underlayer and integrated intensity ratio $I_{(111)}/I_{(100)}$

| Addition amount | Pt | FePt |
|---|---|---|
| 0 | 0.0008 | 0.001 |
| 0.1 | 0.0009 | 0.003 |
| 0.5 | 0.001 | 0.003 |
| 1 | 0.002 | 0.004 |
| 6 | 0.002 | 0.004 |
| 10 | 0.004 | 0.005 |
| 20 | 0.004 | 0.005 |
| 30 | 0.005 | 0.006 |
| 40 | 0.005 | 0.007 |
| 50 | 0.009 | 0.008 |
| 55 | 0.1 | 0.1 |
| 60 | 2 | 2 |

From the above results, to promote magnetic isolation between the magnetic crystals in the magnetic layer made of an ordered alloy, it is preferable to use an underlayer which contains a group A element as a matrix material and 0.1 mol % or more of a group B element or compound added to the matrix material. To fabricate a perpendicular magnetic recording medium, the upper limit of the addition amount of a group B element or compound to the underlayer is preferably set to 50 mol %.

Example 2

A magnetic recording medium shown in FIG. 1 was fabricated in this Example.

A glass disk substrate was used as a substrate 1, and an MgO layer about 10 nm thick was formed as a seed layer 21.

An underlayer 22 was formed to have a thickness of about 20 nm by using a material comprising Pt or Pd of a group A element as a matrix material and 10 mol % of C, Ta, Mo, W, Nb, SiO$_2$, MgO or Al$_2$O$_3$ of a group B element or compound added to the matrix material.

A magnetic layer 3 was formed to have a thickness of about 5 nm by using a material comprising FePt as a main component and 0 to 50 mol % of C, Ta, Mo, W, Nb, SiO$_2$, MgO or Al$_2$O$_3$ added to the main component.

A carbon layer about 10 nm thick was formed as a protective layer 4.

The $V_a/V$ values of magnetic recording media each having an underlayer in which the addition amount of a group B element or compound (C, Ta, Mo, W, Nb, SiO$_2$, MgO, or Al$_2$O$_3$) was 10 mol % with respect to a group A element (Pt or Pd), and an FePt—X magnetic layer in which the addition amount of a group B element or compound X (X is C, Ta, Mo, W, Nb, SiO$_2$, MgO, or Al$_2$O$_3$) was 10 mol %, were evaluated following the same procedures as in Example 1. As a consequence, the evaluation of the $V_a/V$ value of each medium was class A or B, indicating that magnetic isolation further improved by the addition of a group B element or compound to the magnetic layer in addition to the underlayer.

Figure 6:
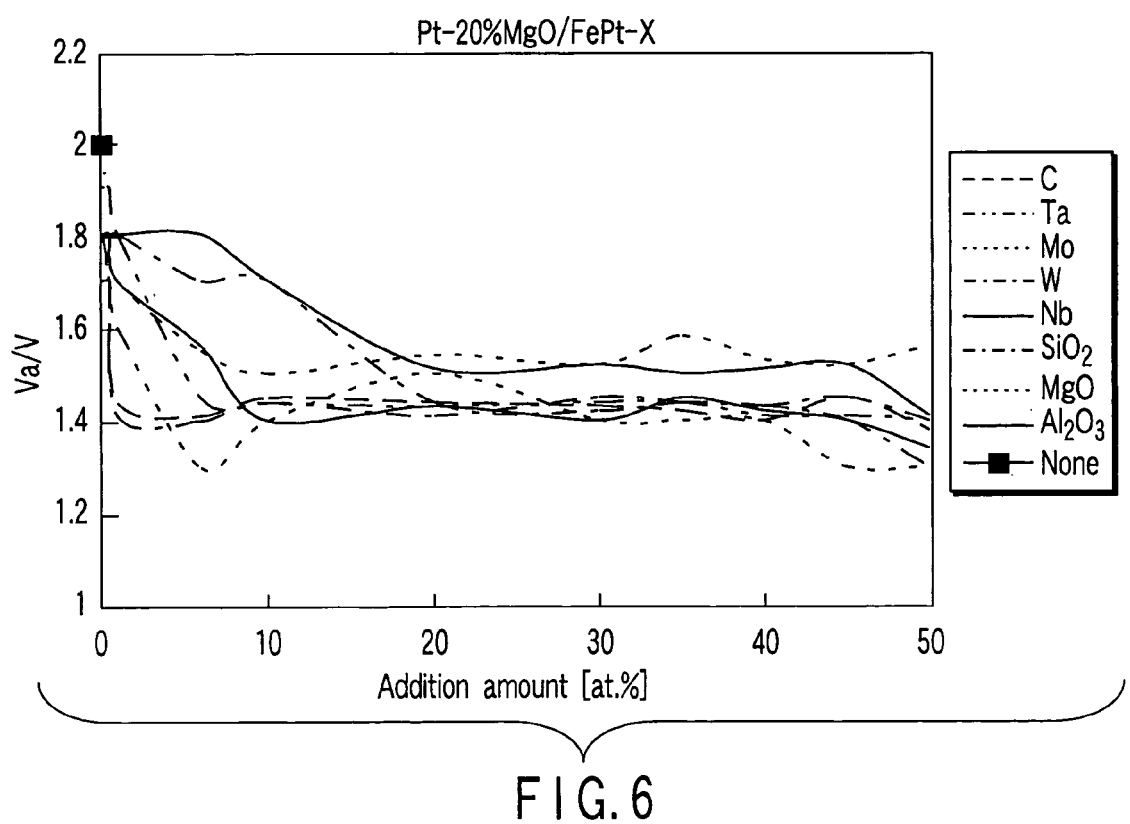
FIG. 6 is a graph showing the relationship between the addition amount of each group B element or compound to a magnetic layer and $V_d/V$ in magnetic recording media according to the present invention.

FIG. 6 and Table 6 show the relationship between the amount of each group B element or compound to the magnetic layer and $V_a/V$ in a medium having a Pt—20% MgO underlayer and a magnetic layer represented by FePt—X (X is C, Ta, Mo, W, Nb, SiO$_2$, MgO, or Al$_2$O$_3$).

The relationship between the amount of a group B element or compound to the magnetic layer and $V_a/V$ in each of underlayer/magnetic layer combinations presented below is also shown.

Figure 9:
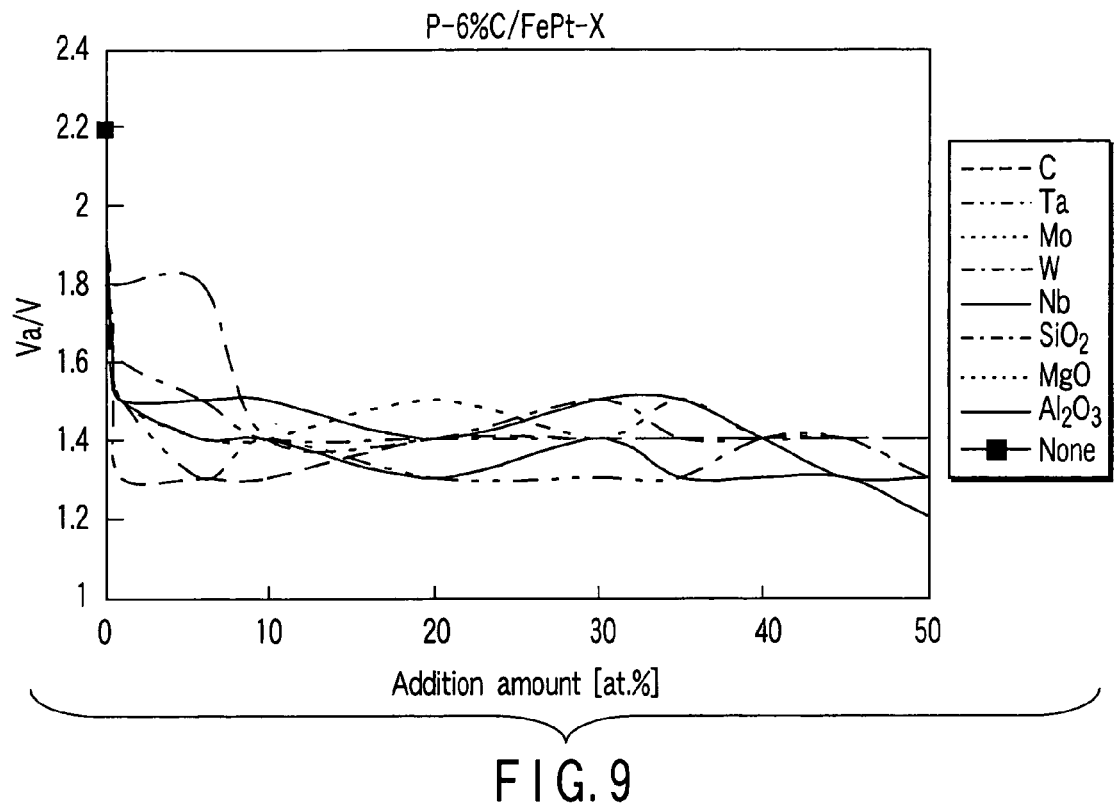
FIG. 9 is a graph showing the relationship between the addition amount of each group B element or compound to a magnetic layer and $V_d/V$ in magnetic recording media according to the present invention.
Figure 10:
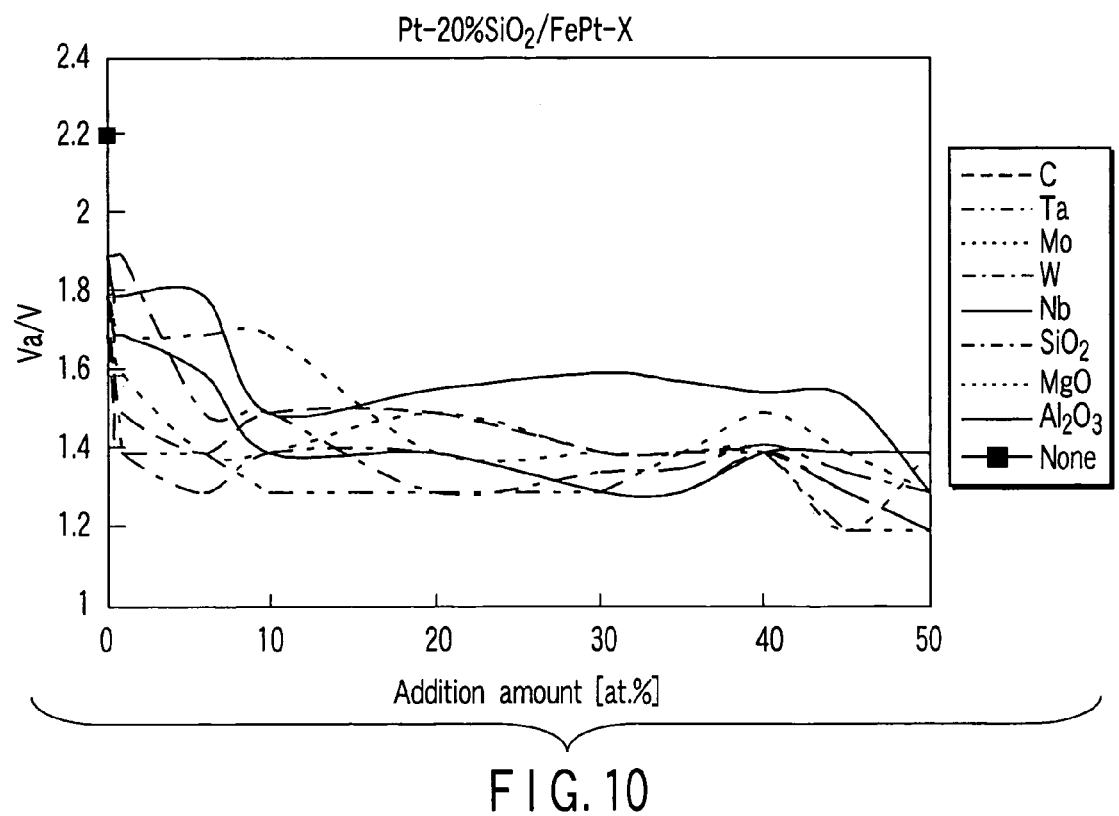
FIG. 10 is a graph showing the relationship between the addition amount of each group B element or compound to a magnetic layer and $V_d/V$ in magnetic recording media according to the present invention.
Figure 11:
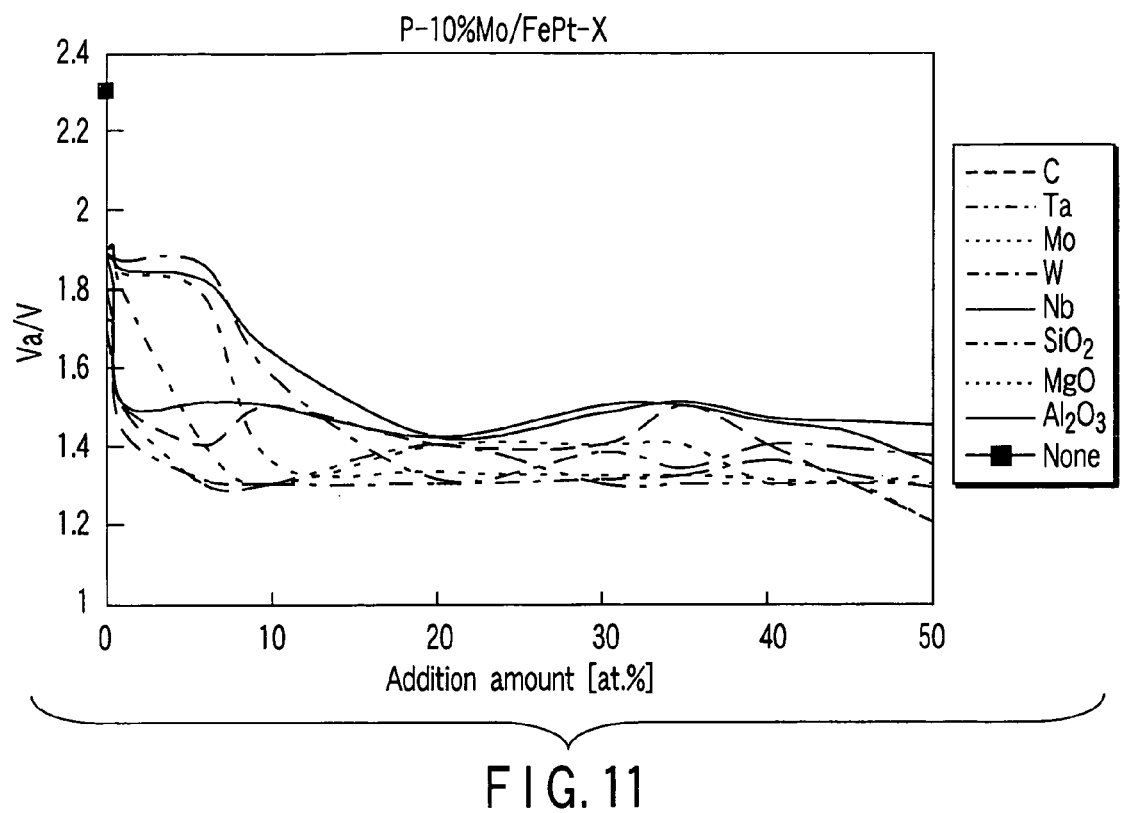
FIG. 11 is a graph showing the relationship between the addition amount of each group B element or compound to a magnetic layer and $V_d/V$ in magnetic recording medium according to the present invention.
Figure 12:
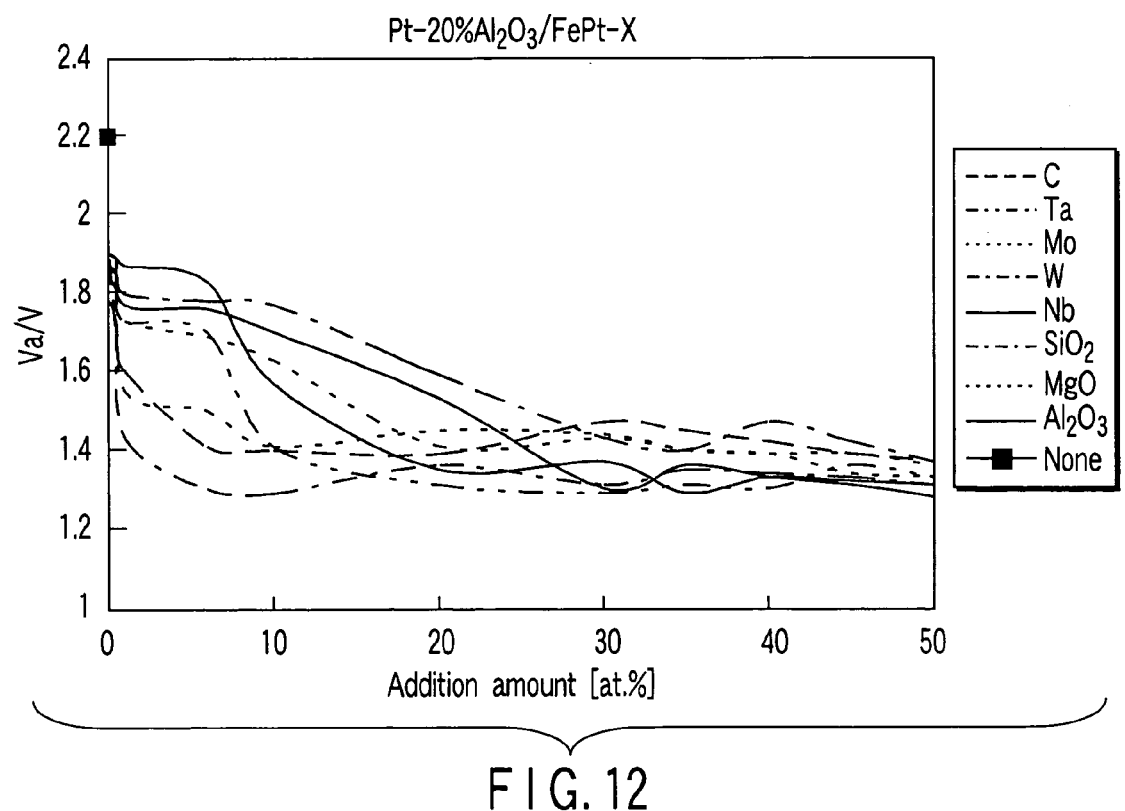
FIG. 12 is a graph showing the relationship between the addition amount of each group B element or compound to a magnetic layer and $V_d/V$ in magnetic recording media according to the present invention.
Figure 13:
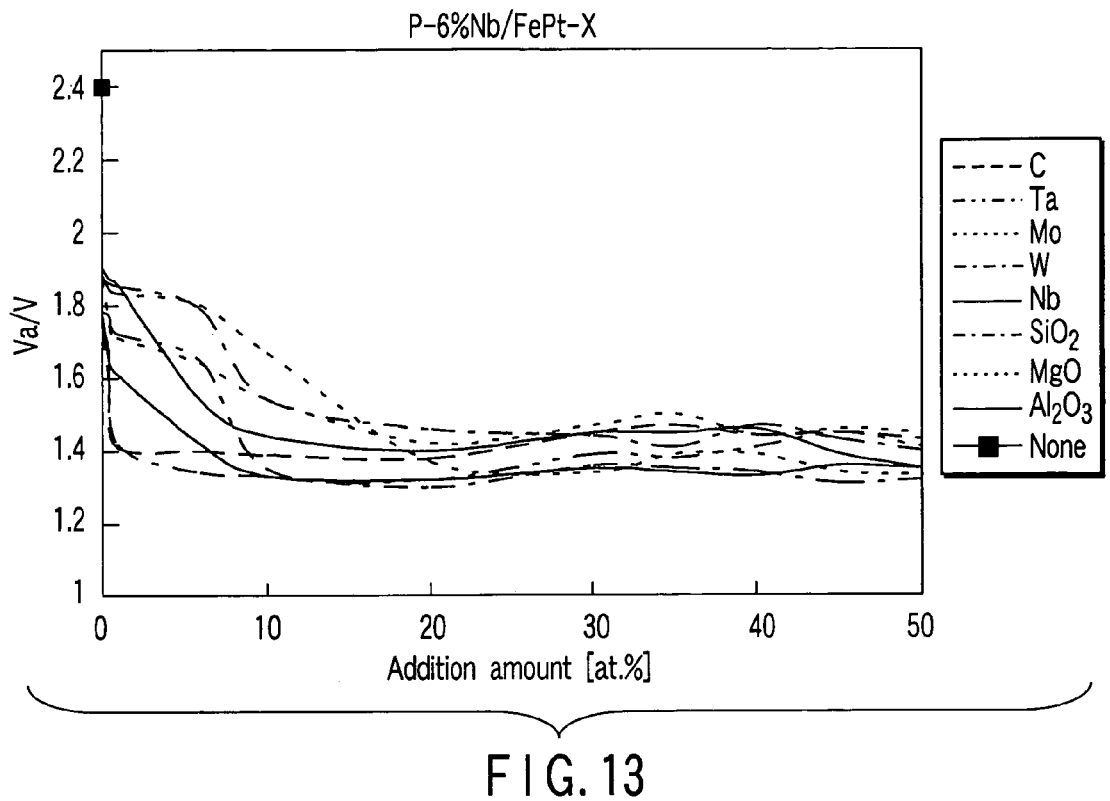
FIG. 13 is a graph showing the relationship between the addition amount of each group B element or compound to a magnetic layer and $V_d/V$ in magnetic recording media according to the present invention.
Figure 14:
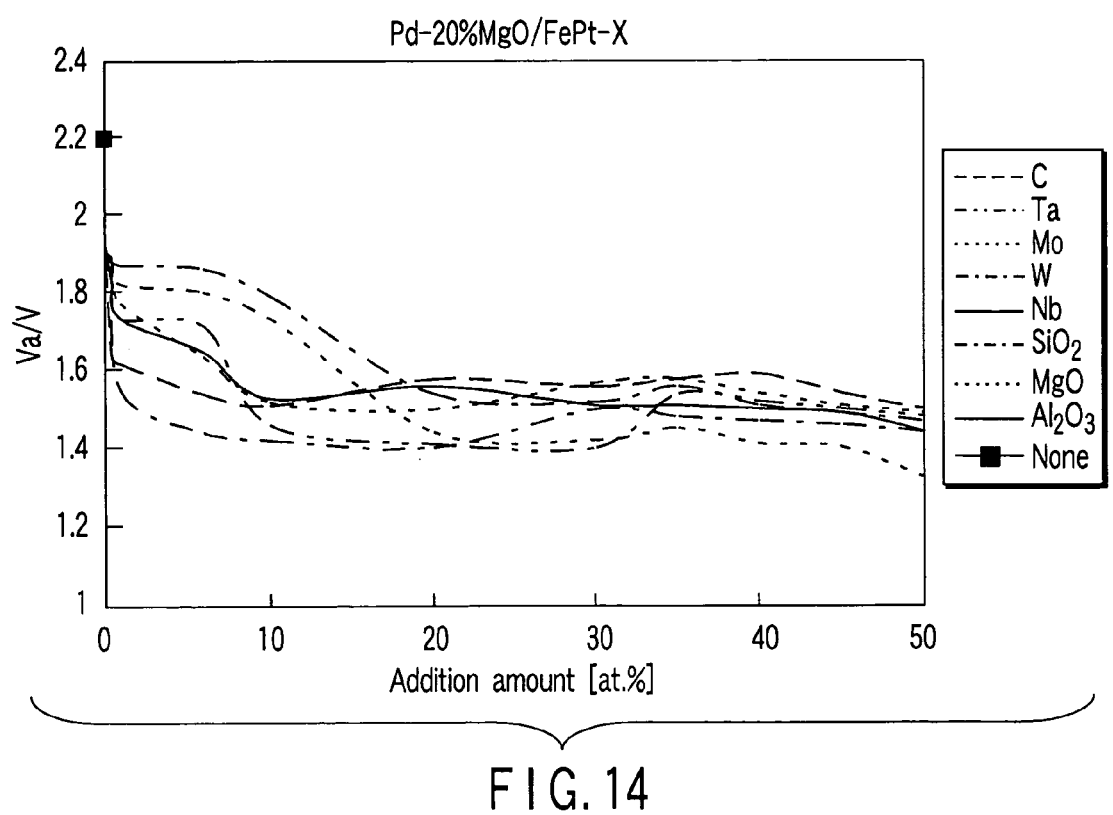
FIG. 14 is a graph showing the relationship between the addition amount of each group B element or compound to a magnetic layer and $V_d/V$ in magnetic recording media according to the present invention.
Figure 15:
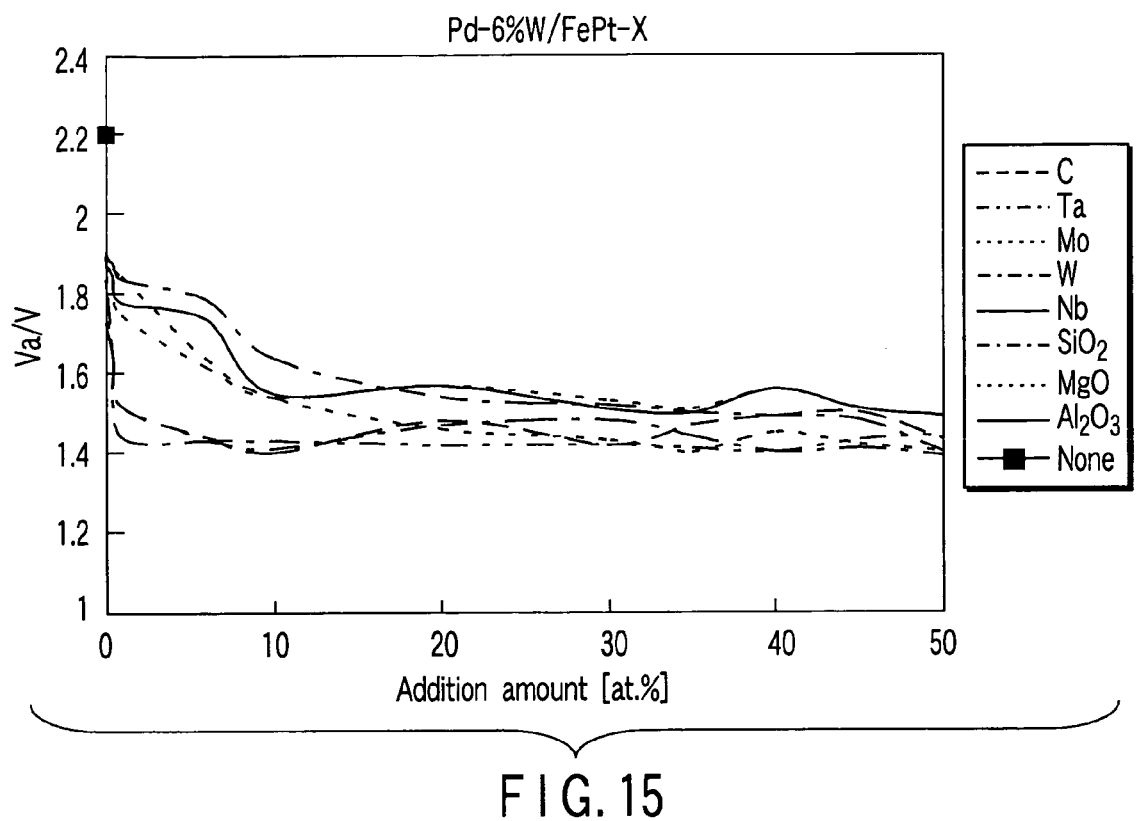
FIG. 15 is a graph showing the relationship between the addition amount of each group B element or compound to a magnetic layer and $V_d/V$ in magnetic recording media according to the present invention.
Figure 16:
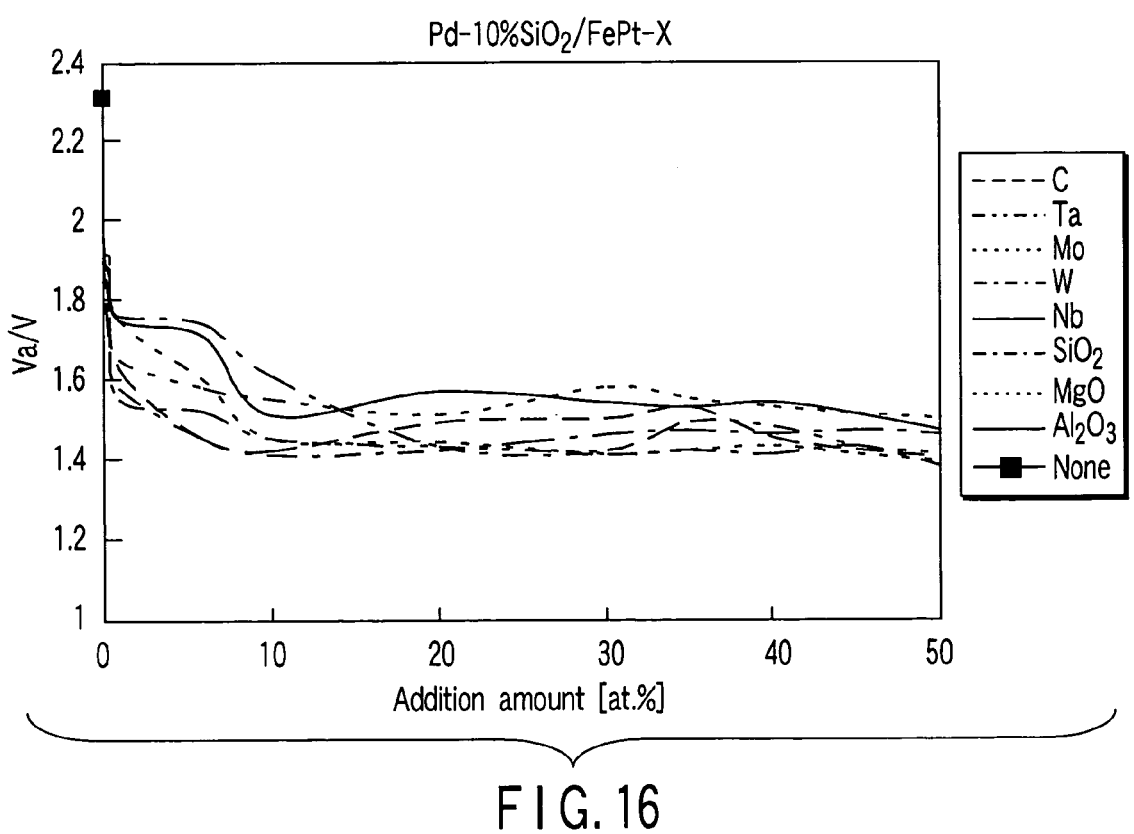
FIG. 16 is a graph showing the relationship between the addition amount of each group B element or compound to a magnetic layer and $V_d/V$ in magnetic recording media according to the present invention.
Figure 17:
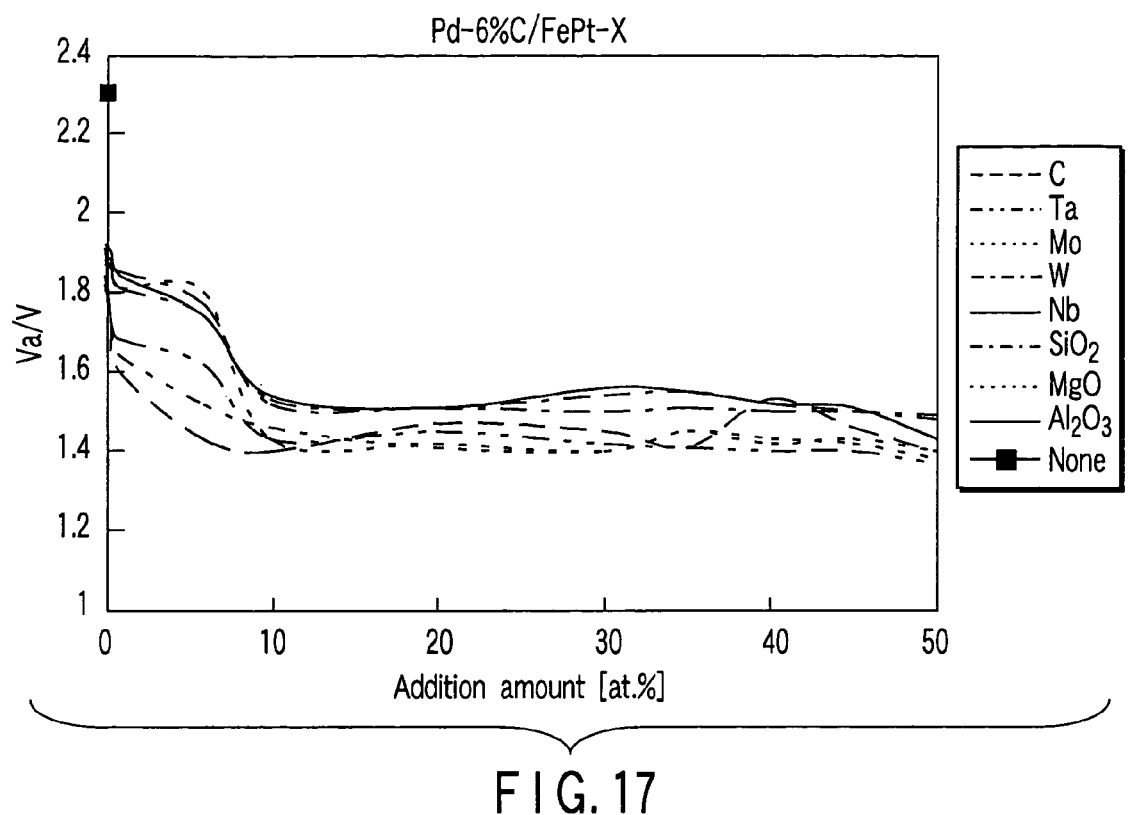
FIG. 17 is a graph showing the relationship between the addition amount of each group B element or compound to a magnetic layer and $V_d/V$ in magnetic recording media according to the present invention.
Figure 18:
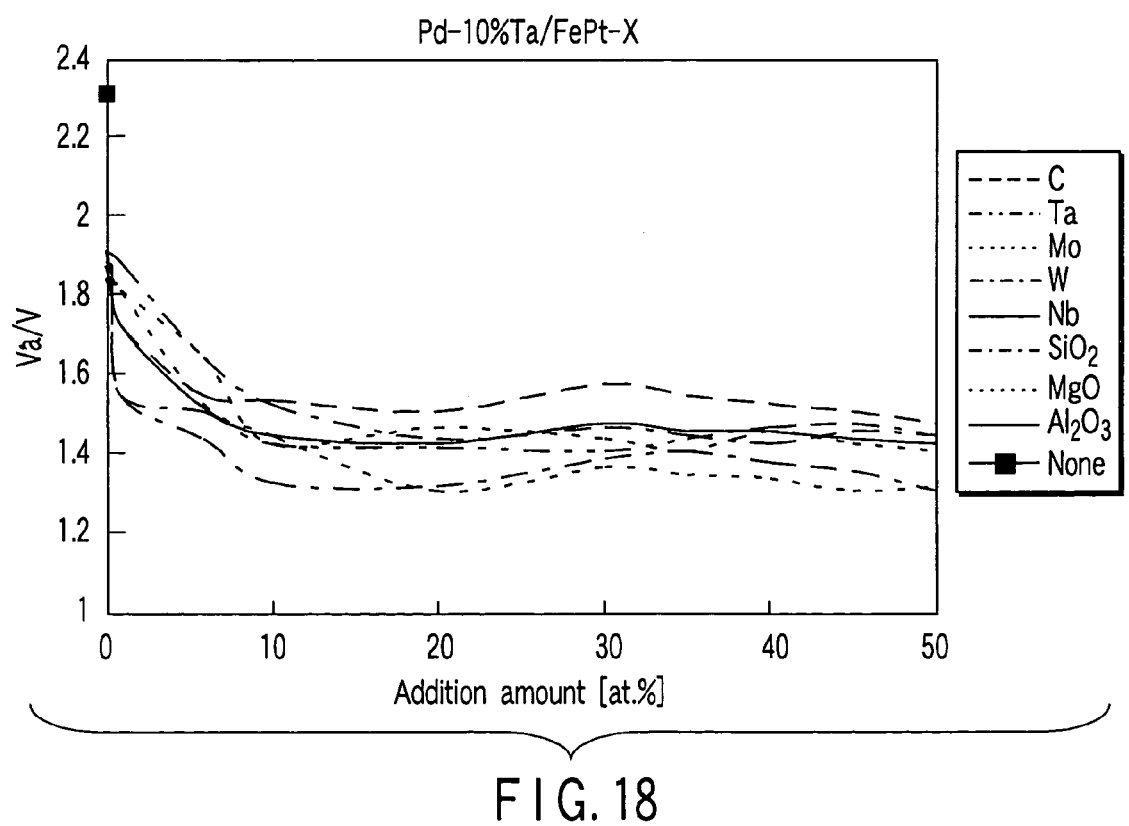
FIG. 18 is a graph showing the relationship between the addition amount of each group B element or compound to a magnetic layer and $V_d/V$ in magnetic recording media according to the present invention.

Pt-10% W/FePt—X (FIG. 7 and Table 7)
Pt-10% Ta/FePt—X (FIG. 8 and Table 8)
Pt-6% C/FePt—X (FIG. 9 and Table 9)
Pt-20% SiO$_2$/FePt—X (FIG. 10 and Table 10)
Pt-10% Mo/FePt—X (FIG. 11 and Table 11)
Pt-20% Al$_2$O$_3$/FePt—X (FIG. 12 and Table 12)
Pt-6% Nb/FePt—X (FIG. 13 and Table 13)
Pd-20% MgO/FePt—X (FIG. 14 and Table 14)
Pd-6% W/FePt—X (FIG. 15 and Table 15)
Pd-10% SiO$_2$/FePt—X (FIG. 16 and Table 16)
Pd-6% C/FePt—X (FIG. 17 and Table 17)
Pd-10% Ta/FePt—X (FIG. 18 and Table 18)
Pd-6% Mo/FePt—X (FIG. 19 and Table 19)
Pd-10% Nb/FePt—X (FIG. 20 and Table 20)

In each medium, the $V_a/V$ value significantly reduced when the addition amount of a group B element or compound to the magnetic layer containing FePt as a main component, formed on the underlayer containing a group A element and a group B element or compound, was 0.1 mol % or more. This indicates that magnetic isolation between the magnetic grains in the magnetic layer further improved.

TABLE 6

Relationship between amount of X element to FePt—X magnetic layer on Pt-20% MgO underlayer and $V_a/V$

| Addition amount | C | Ta | Mo | W | Nb | SiO$_2$ | MgO | Al$_2$O$_3$ | None |
|---|---|---|---|---|---|---|---|---|---|
| 0 | | | | | | | | | 2 |
| 0.1 | 1.8 | 1.9 | 1.8 | 1.7 | 1.8 | 1.8 | 1.8 | 1.8 | |
| 0.5 | 1.7 | 1.9 | 1.8 | 1.7 | 1.8 | 1.8 | 1.7 | 1.8 | |
| 1 | 1.44 | 1.8 | 1.7 | 1.41 | 1.7 | 1.8 | 1.6 | 1.8 | |
| 6 | 1.41 | 1.45 | 1.55 | 1.4 | 1.56 | 1.7 | 1.3 | 1.8 | |
| 10 | 1.45 | 1.44 | 1.5 | 1.44 | 1.4 | 1.7 | 1.4 | 1.7 | |
| 20 | 1.44 | 1.43 | 1.54 | 1.41 | 1.43 | 1.44 | 1.5 | 1.51 | |
| 30 | 1.43 | 1.44 | 1.52 | 1.45 | 1.4 | 1.42 | 1.4 | 1.52 | |
| 35 | 1.42 | 1.44 | 1.58 | 1.44 | 1.45 | 1.44 | 1.4 | 1.5 | |
| 40 | 1.4 | 1.41 | 1.53 | 1.43 | 1.42 | 1.43 | 1.4 | 1.51 | |
| 45 | 1.45 | 1.41 | 1.52 | 1.4 | 1.4 | 1.45 | 1.3 | 1.52 | |
| 50 | 1.38 | 1.4 | 1.56 | 1.3 | 1.34 | 1.4 | 1.3 | 1.41 | |

TABLE 7

Relationship between amount of X element to FePt—X magnetic layer on Pt-10% W underlayer and $V_a/V$

| Addition amount | C | Ta | Mo | W | Nb | SiO$_2$ | MgO | Al$_2$O$_3$ | None |
|---|---|---|---|---|---|---|---|---|---|
| 0 | | | | | | | | | 2 |
| 0.1 | 1.8 | 1.7 | 1.8 | 1.8 | 1.8 | 1.8 | 1.8 | 1.81 | |
| 0.5 | 1.5 | 1.5 | 1.7 | 1.5 | 1.7 | 1.8 | 1.8 | 1.62 | |
| 1 | 1.3 | 1.4 | 1.7 | 1.4 | 1.7 | 1.8 | 1.6 | 1.71 | |
| 6 | 1.4 | 1.3 | 1.7 | 1.4 | 1.5 | 1.6 | 1.6 | 1.6 | |
| 10 | 1.3 | 1.4 | 1.45 | 1.3 | 1.45 | 1.5 | 1.4 | 1.45 | |
| 20 | 1.3 | 1.3 | 1.41 | 1.3 | 1.46 | 1.4 | 1.33 | 1.47 | |
| 30 | 1.3 | 1.3 | 1.41 | 1.3 | 1.51 | 1.4 | 1.46 | 1.52 | |
| 35 | 1.4 | 1.3 | 1.44 | 1.4 | 1.53 | 1.5 | 1.32 | 1.45 | |
| 40 | 1.3 | 1.3 | 1.43 | 1.3 | 1.45 | 1.6 | 1.35 | 1.45 | |
| 45 | 1.3 | 1.4 | 1.41 | 1.4 | 1.46 | 1.6 | 1.34 | 1.45 | |
| 50 | 1.2 | 1.4 | 1.42 | 1.3 | 1.41 | 1.56 | 1.3 | 1.4 | |

TABLE 8

Relationship between amount of X element to FePt—X magnetic layer on Pt-10% Ta underlayer and $V_a/V$

| Addition amount | C | Ta | Mo | W | Nb | SiO$_2$ | MgO | Al$_2$O$_3$ | None |
|---|---|---|---|---|---|---|---|---|---|
| 0 | | | | | | | | | 2.1 |
| 0.1 | 1.6 | 1.7 | 1.8 | 1.7 | 1.7 | 1.8 | 1.8 | 1.8 | |
| 0.5 | 1.3 | 1.5 | 1.7 | 1.6 | 1.7 | 1.7 | 1.6 | 1.8 | |
| 1 | 1.3 | 1.4 | 1.5 | 1.5 | 1.7 | 1.7 | 1.6 | 1.8 | |
| 6 | 1.3 | 1.4 | 1.5 | 1.3 | 1.55 | 1.5 | 1.4 | 1.7 | |
| 10 | 1.4 | 1.3 | 1.4 | 1.3 | 1.51 | 1.5 | 1.3 | 1.57 | |
| 20 | 1.3 | 1.4 | 1.4 | 1.3 | 1.4 | 1.4 | 1.3 | 1.51 | |
| 30 | 1.4 | 1.4 | 1.4 | 1.4 | 1.5 | 1.4 | 1.3 | 1.54 | |
| 35 | 1.5 | 1.3 | 1.4 | 1.3 | 1.5 | 1.5 | 1.4 | 1.52 | |
| 40 | 1.4 | 1.3 | 1.4 | 1.4 | 1.4 | 1.4 | 1.4 | 1.51 | |
| 45 | 1.3 | 1.4 | 1.4 | 1.3 | 1.4 | 1.4 | 1.4 | 1.5 | |
| 50 | 1.3 | 1.3 | 1.3 | 1.3 | 1.4 | 1.4 | 1.4 | 1.46 | |

TABLE 9

Relationship between amount of X element to FePt—X magnetic layer on Pt-6% C underlayer and $V_a/V$

| Addition amount | C | Ta | Mo | W | Nb | SiO$_2$ | MgO | Al$_2$O$_3$ | None |
|---|---|---|---|---|---|---|---|---|---|
| 0 | | | | | | | | | 2.2 |
| 0.1 | 1.7 | 1.7 | 1.8 | 1.8 | 1.9 | 1.9 | 1.8 | 1.8 | |
| 0.5 | 1.5 | 1.6 | 1.7 | 1.7 | 1.6 | 1.8 | 1.6 | 1.6 | |
| 1 | 1.3 | 1.5 | 1.5 | 1.6 | 1.5 | 1.8 | 1.5 | 1.5 | |
| 6 | 1.3 | 1.3 | 1.4 | 1.5 | 1.5 | 1.8 | 1.4 | 1.4 | |
| 10 | 1.3 | 1.4 | 1.4 | 1.4 | 1.5 | 1.4 | 1.4 | 1.4 | |
| 20 | 1.4 | 1.3 | 1.5 | 1.4 | 1.4 | 1.4 | 1.3 | 1.3 | |
| 30 | 1.4 | 1.3 | 1.4 | 1.4 | 1.5 | 1.5 | 1.4 | 1.4 | |
| 35 | 1.4 | 1.3 | 1.5 | 1.4 | 1.5 | 1.4 | 1.3 | 1.3 | |
| 40 | 1.4 | 1.4 | 1.4 | 1.4 | 1.4 | 1.4 | 1.3 | 1.3 | |
| 45 | 1.4 | 1.4 | 1.4 | 1.4 | 1.3 | 1.4 | 1.3 | 1.3 | |
| 50 | 1.4 | 1.3 | 1.3 | 1.4 | 1.3 | 1.3 | 1.2 | 1.2 | |

TABLE 10

Relationship between amount of X element to FePt—X magnetic layer on Pt-20% SiO$_2$ underlayer and V$_a$/V

| Addition amount | C | Ta | Mo | W | Nb | SiO$_2$ | MgO | Al$_2$O$_3$ | None |
|---|---|---|---|---|---|---|---|---|---|
| 0 | | | | | | | | | 2.2 |
| 0.1 | 1.8 | 1.7 | 1.9 | 1.7 | 1.9 | 1.9 | 1.8 | 1.8 | |
| 0.5 | 1.6 | 1.6 | 1.7 | 1.5 | 1.8 | 1.9 | 1.8 | 1.7 | |
| 1 | 1.5 | 1.4 | 1.6 | 1.4 | 1.8 | 1.9 | 1.7 | 1.7 | |
| 6 | 1.4 | 1.4 | 1.4 | 1.3 | 1.8 | 1.5 | 1.7 | 1.6 | |
| 10 | 1.5 | 1.3 | 1.4 | 1.4 | 1.5 | 1.5 | 1.7 | 1.4 | |
| 20 | 1.5 | 1.3 | 1.5 | 1.4 | 1.56 | 1.3 | 1.4 | 1.4 | |
| 30 | 1.4 | 1.3 | 1.4 | 1.3 | 1.6 | 1.35 | 1.4 | 1.3 | |
| 35 | 1.4 | 1.4 | 1.4 | 1.3 | 1.58 | 1.36 | 1.4 | 1.3 | |
| 40 | 1.4 | 1.4 | 1.4 | 1.4 | 1.55 | 1.42 | 1.5 | 1.4 | |
| 45 | 1.3 | 1.2 | 1.2 | 1.3 | 1.54 | 1.35 | 1.4 | 1.4 | |
| 50 | 1.2 | 1.2 | 1.4 | 1.2 | 1.3 | 1.3 | 1.3 | 1.4 | |

TABLE 11

Relationship between amount of X element to FePt—X magnetic layer on Pt-10% Mo underlayer and V$_a$/V

| Addition amount | C | Ta | Mo | W | Nb | SiO$_2$ | MgO | Al$_2$O$_3$ | None |
|---|---|---|---|---|---|---|---|---|---|
| 0 | | | | | | | | | 2.3 |
| 0.1 | 1.7 | 1.8 | 1.9 | 1.72 | 1.88 | 1.89 | 1.88 | 1.9 | |
| 0.5 | 1.6 | 1.7 | 1.9 | 1.71 | 1.81 | 1.88 | 1.87 | 1.91 | |
| 1 | 1.5 | 1.5 | 1.8 | 1.44 | 1.51 | 1.87 | 1.84 | 1.85 | |
| 6 | 1.4 | 1.3 | 1.4 | 1.31 | 1.51 | 1.86 | 1.78 | 1.82 | |
| 10 | 1.5 | 1.3 | 1.3 | 1.3 | 1.5 | 1.58 | 1.36 | 1.64 | |
| 20 | 1.4 | 1.4 | 1.4 | 1.3 | 1.42 | 1.31 | 1.33 | 1.42 | |
| 30 | 1.4 | 1.3 | 1.4 | 1.31 | 1.5 | 1.38 | 1.32 | 1.48 | |
| 35 | 1.5 | 1.3 | 1.4 | 1.32 | 1.5 | 1.34 | 1.32 | 1.51 | |
| 40 | 1.4 | 1.3 | 1.3 | 1.36 | 1.46 | 1.4 | 1.31 | 1.47 | |
| 45 | 1.3 | 1.3 | 1.3 | 1.32 | 1.43 | 1.39 | 1.3 | 1.46 | |
| 50 | 1.2 | 1.3 | 1.2 | 1.29 | 1.35 | 1.37 | 1.32 | 1.45 | |

TABLE 12

Relationship between amount of X element to FePt—X magnetic layer on Pt-20% Al$_2$O$_3$ underlayer and V$_a$/V

| Addition amount | C | Ta | Mo | W | Nb | SiO$_2$ | MgO | Al$_2$O$_3$ | None |
|---|---|---|---|---|---|---|---|---|---|
| 0 | | | | | | | | | 2.3 |
| 0.1 | 1.9 | 1.85 | 1.88 | 1.79 | 1.91 | 1.87 | 1.84 | 1.91 | |
| 0.5 | 1.68 | 1.82 | 1.86 | 1.73 | 1.9 | 1.86 | 1.82 | 1.9 | |
| 1 | 1.61 | 1.74 | 1.56 | 1.44 | 1.88 | 1.81 | 1.74 | 1.78 | |
| 6 | 1.42 | 1.71 | 1.51 | 1.31 | 1.84 | 1.79 | 1.7 | 1.77 | |
| 10 | 1.41 | 1.42 | 1.42 | 1.3 | 1.58 | 1.78 | 1.64 | 1.71 | |
| 20 | 1.4 | 1.32 | 1.46 | 1.37 | 1.36 | 1.6 | 1.42 | 1.54 | |
| 30 | 1.48 | 1.3 | 1.45 | 1.32 | 1.38 | 1.44 | 1.44 | 1.31 | |
| 35 | 1.46 | 1.32 | 1.41 | 1.36 | 1.3 | 1.41 | 1.41 | 1.37 | |
| 40 | 1.43 | 1.31 | 1.4 | 1.35 | 1.34 | 1.48 | 1.4 | 1.34 | |
| 45 | 1.4 | 1.37 | 1.4 | 1.34 | 1.33 | 1.43 | 1.35 | 1.32 | |
| 50 | 1.38 | 1.34 | 1.37 | 1.32 | 1.32 | 1.38 | 1.34 | 1.29 | |

TABLE 13

Relationship between amount of X element to FePt—X magnetic layer on Pt-60% Nb underlayer and V$_a$/V

| Addition amount | C | Ta | Mo | W | Nb | SiO$_2$ | MgO | Al$_2$O$_3$ | None |
|---|---|---|---|---|---|---|---|---|---|
| 0 | | | | | | | | | 2.4 |
| 0.1 | 1.75 | 1.78 | 1.87 | 1.74 | 1.77 | 1.87 | 1.88 | 1.9 | |
| 0.5 | 1.58 | 1.77 | 1.74 | 1.67 | 1.64 | 1.86 | 1.84 | 1.87 | |
| 1 | 1.41 | 1.72 | 1.71 | 1.42 | 1.61 | 1.85 | 1.83 | 1.86 | |
| 6 | 1.4 | 1.65 | 1.64 | 1.34 | 1.42 | 1.79 | 1.8 | 1.54 | |
| 10 | 1.39 | 1.35 | 1.54 | 1.33 | 1.33 | 1.54 | 1.67 | 1.44 | |
| 20 | 1.38 | 1.32 | 1.42 | 1.3 | 1.32 | 1.46 | 1.37 | 1.4 | |
| 30 | 1.45 | 1.39 | 1.47 | 1.36 | 1.35 | 1.44 | 1.34 | 1.45 | |
| 35 | 1.47 | 1.38 | 1.5 | 1.35 | 1.34 | 1.41 | 1.39 | 1.45 | |
| 40 | 1.44 | 1.41 | 1.44 | 1.34 | 1.33 | 1.47 | 1.39 | 1.46 | |
| 45 | 1.45 | 1.45 | 1.46 | 1.31 | 1.36 | 1.43 | 1.34 | 1.39 | |
| 50 | 1.43 | 1.41 | 1.45 | 1.32 | 1.35 | 1.4 | 1.33 | 1.35 | |

TABLE 14

Relationship between amount of X element to FePt—X magnetic layer on Pt-20% MgO underlayer and $V_a/V$

| Addition amount | C | Ta | Mo | W | Nb | SiO$_2$ | MgO | None |
|---|---|---|---|---|---|---|---|---|
| 0 | | | | | | | | 2.2 |
| 0.1 | 1.89 | 1.9 | 1.88 | 1.91 | 1.93 | 1.9 | 1.92 | |
| 0.5 | 1.64 | 1.84 | 1.87 | 1.9 | 1.84 | 1.89 | 1.89 | |
| 1 | 1.62 | 1.74 | 1.78 | 1.55 | 1.74 | 1.88 | 1.83 | |
| 6 | 1.54 | 1.72 | 1.64 | 1.44 | 1.65 | 1.87 | 1.81 | |
| 10 | 1.51 | 1.46 | 1.52 | 1.42 | 1.53 | 1.8 | 1.74 | |
| 20 | 1.58 | 1.41 | 1.5 | 1.4 | 1.56 | 1.54 | 1.44 | |
| 30 | 1.56 | 1.4 | 1.57 | 1.5 | 1.51 | 1.52 | 1.42 | |
| 35 | 1.58 | 1.54 | 1.58 | 1.48 | 1.51 | 1.56 | 1.45 | |
| 40 | 1.59 | 1.52 | 1.54 | 1.47 | 1.5 | 1.51 | 1.41 | |
| 45 | 1.54 | 1.5 | 1.51 | 1.46 | 1.49 | 1.49 | 1.4 | |
| 50 | 1.5 | 1.48 | 1.49 | 1.44 | 1.44 | 1.47 | 1.32 | |

TABLE 15

Relationship between amount of X element to FePt—X magnetic layer on Pt-6% W underlayer and $V_a/V$

| Addition amount | C | Ta | Mo | W | Nb | SiO$_2$ | MgO | None |
|---|---|---|---|---|---|---|---|---|
| 0 | | | | | | | | 2.2 |
| 0.1 | 1.9 | 1.84 | 1.88 | 1.73 | 1.88 | 1.89 | 1.91 | |
| 0.5 | 1.64 | 1.63 | 1.84 | 1.64 | 1.85 | 1.88 | 1.87 | |
| 1 | 1.52 | 1.52 | 1.75 | 1.44 | 1.78 | 1.84 | 1.85 | |
| 6 | 1.44 | 1.44 | 1.62 | 1.43 | 1.74 | 1.79 | 1.64 | |
| 10 | 1.4 | 1.43 | 1.54 | 1.41 | 1.55 | 1.64 | 1.54 | |
| 20 | 1.48 | 1.42 | 1.57 | 1.47 | 1.57 | 1.54 | 1.46 | |
| 30 | 1.42 | 1.42 | 1.53 | 1.48 | 1.51 | 1.52 | 1.43 | |
| 35 | 1.47 | 1.41 | 1.51 | 1.44 | 1.5 | 1.5 | 1.4 | |
| 40 | 1.49 | 1.4 | 1.56 | 1.4 | 1.56 | 1.49 | 1.45 | |
| 45 | 1.5 | 1.43 | 1.51 | 1.41 | 1.51 | 1.48 | 1.42 | |
| 50 | 1.43 | 1.44 | 1.49 | 1.39 | 1.49 | 1.4 | 1.4 | |

TABLE 16

Relationship between amount of X element to FePt—X magnetic layer on Pt-10% SiO$_2$ underlayer and $V_a/V$

| Addition amount | C | Ta | Mo | W | Nb | SiO$_2$ | MgO | None |
|---|---|---|---|---|---|---|---|---|
| 0 | | | | | | | | 2.3 |
| 0.1 | 1.9 | 1.95 | 1.84 | 1.89 | 1.88 | 1.84 | 1.91 | |
| 0.5 | 1.84 | 1.74 | 1.75 | 1.66 | 1.87 | 1.81 | 1.9 | |
| 1 | 1.62 | 1.54 | 1.64 | 1.57 | 1.74 | 1.75 | 1.74 | |
| 6 | 1.44 | 1.51 | 1.57 | 1.44 | 1.7 | 1.73 | 1.59 | |
| 10 | 1.41 | 1.44 | 1.54 | 1.4 | 1.5 | 1.6 | 1.44 | |
| 20 | 1.48 | 1.42 | 1.5 | 1.41 | 1.56 | 1.42 | 1.43 | |
| 30 | 1.49 | 1.41 | 1.57 | 1.45 | 1.53 | 1.4 | 1.4 | |
| 35 | 1.52 | 1.48 | 1.54 | 1.46 | 1.52 | 1.41 | 1.41 | |
| 40 | 1.44 | 1.47 | 1.52 | 1.45 | 1.53 | 1.4 | 1.42 | |
| 45 | 1.41 | 1.42 | 1.5 | 1.46 | 1.5 | 1.42 | 1.4 | |
| 50 | 1.39 | 1.4 | 1.49 | 1.45 | 1.46 | 1.37 | 1.38 | |

TABLE 17

Relationship between amount of X element to FePt—X magnetic layer on Pt-6% C underlayer and $V_a/V$

| Addition amount | C | Ta | Mo | W | Nb | SiO$_2$ | MgO | None |
|---|---|---|---|---|---|---|---|---|
| 0 | | | | | | | | 2.3 |
| 0.1 | 1.91 | 1.84 | 1.82 | 1.88 | 1.92 | 1.87 | 1.88 | |
| 0.5 | 1.72 | 1.72 | 1.7 | 1.86 | 1.9 | 1.86 | 1.88 | |
| 1 | 1.6 | 1.68 | 1.64 | 1.81 | 1.84 | 1.85 | 1.81 | |
| 6 | 1.43 | 1.62 | 1.52 | 1.74 | 1.74 | 1.77 | 1.8 | |
| 10 | 1.4 | 1.43 | 1.46 | 1.53 | 1.54 | 1.52 | 1.43 | |
| 20 | 1.47 | 1.45 | 1.41 | 1.51 | 1.51 | 1.51 | 1.42 | |
| 30 | 1.45 | 1.42 | 1.4 | 1.54 | 1.56 | 1.5 | 1.4 | |
| 35 | 1.41 | 1.41 | 1.45 | 1.55 | 1.55 | 1.51 | 1.45 | |
| 40 | 1.53 | 1.4 | 1.43 | 1.52 | 1.52 | 1.5 | 1.42 | |
| 45 | 1.46 | 1.4 | 1.42 | 1.5 | 1.51 | 1.5 | 1.43 | |
| 50 | 1.4 | 1.37 | 1.38 | 1.48 | 1.43 | 1.49 | 1.4 | |

TABLE 18

Relationship between amount of X element to FePt—X magnetic layer on Pt-10% Ta underlayer and $V_a/V$

| Addition amount | C | Ta | Mo | W | Nb | SiO$_2$ | MgO | None |
|---|---|---|---|---|---|---|---|---|
| 0 | | | | | | | | 2.3 |
| 0.1 | 1.91 | 1.84 | 1.91 | 1.87 | 1.88 | 1.91 | 1.87 | |
| 0.5 | 1.84 | 1.79 | 1.84 | 1.81 | 1.87 | 1.9 | 1.84 | |
| 1 | 1.72 | 1.54 | 1.81 | 1.54 | 1.72 | 1.88 | 1.81 | |
| 6 | 1.54 | 1.5 | 1.64 | 1.43 | 1.51 | 1.64 | 1.52 | |
| 10 | 1.53 | 1.42 | 1.42 | 1.32 | 1.44 | 1.52 | 1.44 | |
| 20 | 1.5 | 1.41 | 1.46 | 1.31 | 1.42 | 1.43 | 1.3 | |
| 30 | 1.57 | 1.4 | 1.43 | 1.38 | 1.47 | 1.46 | 1.36 | |
| 35 | 1.54 | 1.43 | 1.4 | 1.4 | 1.45 | 1.44 | 1.34 | |
| 40 | 1.52 | 1.46 | 1.45 | 1.37 | 1.45 | 1.42 | 1.33 | |
| 45 | 1.5 | 1.47 | 1.42 | 1.35 | 1.43 | 1.45 | 1.3 | |
| 50 | 1.47 | 1.44 | 1.4 | 1.3 | 1.42 | 1.44 | 1.31 | |

TABLE 19

Relationship between amount of X element to FePt—X magnetic layer on Pt-6% Mo underlayer and $V_a/V$

| Addition amount | C | Ta | Mo | W | Nb | SiO$_2$ | MgO | None |
|---|---|---|---|---|---|---|---|---|
| 0 | | | | | | | | 2.4 |
| 0.1 | 1.74 | 1.79 | 1.9 | 1.84 | 1.78 | 1.89 | 1.9 | |
| 0.5 | 1.52 | 1.71 | 1.82 | 1.8 | 1.74 | 1.88 | 1.85 | |
| 1 | 1.44 | 1.43 | 1.71 | 1.47 | 1.65 | 1.87 | 1.81 | |
| 6 | 1.41 | 1.34 | 1.63 | 1.32 | 1.52 | 1.53 | 1.76 | |
| 10 | 1.45 | 1.31 | 1.4 | 1.3 | 1.44 | 1.34 | 1.43 | |
| 20 | 1.43 | 1.3 | 1.41 | 1.32 | 1.43 | 1.32 | 1.32 | |
| 30 | 1.46 | 1.35 | 1.45 | 1.35 | 1.46 | 1.34 | 1.31 | |
| 35 | 1.45 | 1.36 | 1.42 | 1.31 | 1.47 | 1.35 | 1.31 | |
| 40 | 1.45 | 1.35 | 1.45 | 1.34 | 1.46 | 1.35 | 1.3 | |
| 45 | 1.41 | 1.34 | 1.46 | 1.31 | 1.44 | 1.35 | 1.3 | |
| 50 | 1.4 | 1.33 | 1.34 | 1.29 | 1.43 | 1.32 | 1.25 | |

TABLE 20

Relationship between amount of X element to FePt—X magnetic layer on Pt-10% Nb underlayer and $V_a/V$

| Addition amount | C | Ta | Mo | W | Nb | SiO$_2$ | MgO | None |
|---|---|---|---|---|---|---|---|---|
| 0 | | | | | | | | 2.4 |
| 0.1 | 1.81 | 1.87 | 1.78 | 1.74 | 1.87 | 1.87 | 1.88 | |
| 0.5 | 1.72 | 1.84 | 1.75 | 1.64 | 1.81 | 1.85 | 1.87 | |
| 1 | 1.62 | 1.82 | 1.72 | 1.53 | 1.64 | 1.84 | 1.84 | |
| 6 | 1.53 | 1.64 | 1.63 | 1.42 | 1.61 | 1.7 | 1.82 | |
| 10 | 1.51 | 1.43 | 1.52 | 1.42 | 1.54 | 1.62 | 1.54 | |

TABLE 20-continued

Relationship between amount of X element to FePt—X
magnetic layer on Pt-10% Nb underlayer and $V_a/V$

| Addition amount | C | Ta | Mo | W | Nb | SiO$_2$ | MgO | None |
|---|---|---|---|---|---|---|---|---|
| 20 | 1.55 | 1.42 | 1.5 | 1.41 | 1.56 | 1.54 | 1.43 | |
| 30 | 1.5 | 1.54 | 1.51 | 1.4 | 1.51 | 1.54 | 1.42 | |
| 35 | 1.51 | 1.52 | 1.57 | 1.4 | 1.56 | 1.5 | 1.41 | |
| 40 | 1.52 | 1.5 | 1.56 | 1.4 | 1.55 | 1.52 | 1.4 | |
| 45 | 1.5 | 1.43 | 1.51 | 1.45 | 1.51 | 1.56 | 1.4 | |
| 50 | 1.47 | 1.4 | 1.43 | 1.38 | 1.5 | 1.5 | 1.38 | |

The XRD profile of a medium having a Pt-20% MgO underlayer and FePtTa magnetic layer was measured to obtain (111) reflection and (001) reflection of each of FePt and Pt, thereby calculating integrated intensity ratios $I_{FePt(111)}/I_{FePt(001)}$ and $I_{Pt(111)}/I_{Pt(100)}$. FIG. 21 and Table 21 show the relationships between the Ta addition amount to the magnetic layer and the integrated intensity ratios.

As can be seen from FIG. 21 and Table 21, the integrated intensity ratio of FePt abruptly increased when the Ta addition amount to the underlayer exceeded 40 mol %, and the perpendicular orientation deteriorated.

TABLE 21

Relationship between Ta amount
to FePtTa underlayer and
integrated intensity ratio $I_{(111)}/I_{(100)}$

| Addition amount | Pt | FePt |
|---|---|---|
| 0 | 0.004 | 0.005 |
| 0.1 | 0.004 | 0.007 |
| 0.5 | 0.004 | 0.007 |
| 1 | 0.004 | 0.008 |
| 6 | 0.004 | 0.008 |
| 10 | 0.004 | 0.008 |
| 20 | 0.004 | 0.008 |
| 30 | 0.004 | 0.009 |
| 40 | 0.004 | 0.009 |
| 45 | 0.004 | 0.05 |
| 50 | 0.004 | 3 |

From the above results, to promote magnetic isolation between the magnetic crystals forming the magnetic layer made of an ordered alloy, it is preferable to use an underlayer containing a group A element and a group B element or compound, and a magnetic layer to which 0.1 mol % or more of a group B element or compound is added. Also, to fabricate a perpendicular magnetic recording medium, the upper limit of the addition amount of a group B element or compound to the magnetic layer is preferably set to 40 mol %.

Example 3

In this example, a magnetic recording medium shown in FIG. 2 was fabricated.

A glass disk substrate was used as a substrate 1, and an NiAl layer about 10 nm thick was formed as a seed layer 21.

A crystal orientation layer 23 was formed to have a thickness of about 20 nm by using a material comprising Cr and 0 to 60 at % of Ti, Ni, Co, Cu or Zn added to Cr.

An underlayer 22 was formed to have a thickness of about 5 nm. The underlayer comprises Pt (the group A) and 20 mol % of SiO$_2$ (the group B).

A magnetic layer 3 was formed to have a thickness of about 5 nm. The magnetic layer comprises Fe$_{45}$Pt$_{50}$Cu$_5$ ternary alloy and 6 at % of Mo added thereto.

A carbon layer about 10 nm thick was formed as a protective layer 4.

The XRD profile of each of media having various Cr—X crystal orientation layers (X was Ti, Ni, Co, Cu, or Zn) with different amount of the additive element was measured. Then, (111) reflection and (001) reflection of each of FePt and Pt were measured to calculate the integrated intensity ratios $I_{FePt(111)}/I_{FePt(001)}$ and $I_{Pt(111)}/I_{Pt(100)}$. FIG. 22 and Table 22 show the relationships between the addition amount of each additive element to the crystal orientation layer 23 and the integrated intensity ratios. In FIG. 22 and Table 22, Ti(Pt), for example, means that Ti is an additive element and Pt is a measuring object in the integrated intensity ratio.

FIG. 22 and Table 22 reveal that the perpendicular orientation significantly improved when the amount of an additive element to the crystal orientation layer 23 was 1 to 50 mol %. Note that, the evaluation of the $V_a/V$ values of all the media were A.

TABLE 22

Relationship between amount of X element to Cr—X crystal orientation
layer and integrated intensity ration $I_{(111)}/I_{(100)}$

| Addition amount | Ti (Pt) | Ti (FePt) | Ni (Pt) | Ni (FePt) | Co (Pt) | Co (FePt) | Cu (Pt) | Cu (FePt) | Zn (Pt) | Zn (FePt) |
|---|---|---|---|---|---|---|---|---|---|---|
| 0 | 0.004 | 0.007 | 0.004 | 0.007 | 0.004 | 0.007 | 0.004 | 0.007 | 0.004 | 0.007 |
| 0.1 | 0.004 | 0.007 | 0.004 | 0.007 | 0.004 | 0.007 | 0.004 | 0.007 | 0.004 | 0.007 |
| 0.5 | 0.004 | 0.007 | 0.004 | 0.007 | 0.004 | 0.007 | 0.004 | 0.007 | 0.004 | 0.007 |
| 1 | 0.001 | 0.004 | 0.002 | 0.004 | 0.0024 | 0.0031 | 0.0022 | 0.0042 | 0.0024 | 0.0039 |
| 6 | 0.001 | 0.003 | 0.0015 | 0.0034 | 0.0021 | 0.003 | 0.002 | 0.0041 | 0.0023 | 0.0031 |
| 10 | 0.0008 | 0.001 | 0.0012 | 0.003 | 0.0019 | 0.001 | 0.0017 | 0.0035 | 0.0018 | 0.0035 |
| 20 | 0.0007 | 0.001 | 0.001 | 0.003 | 0.001 | 0.0021 | 0.0018 | 0.003 | 0.0019 | 0.0038 |
| 30 | 0.0008 | 0.001 | 0.00098 | 0.0034 | 0.0022 | 0.0028 | 0.0019 | 0.0035 | 0.0024 | 0.004 |
| 40 | 0.0005 | 0.004 | 0.001 | 0.0036 | 0.003 | 0.0034 | 0.0021 | 0.0039 | 0.0026 | 0.0045 |
| 50 | 0.001 | 0.005 | 0.002 | 0.005 | 0.0031 | 0.0035 | 0.003 | 0.0042 | 0.003 | 0.005 |
| 55 | 0.1 | 0.5 | 0.2 | 0.52 | 0.8 | 1 | 8 | 9.2 | 2 | 3 |
| 60 | 2 | 7 | 4 | 7 | 15 | 42 | 75 | 56 | 13 | 61 |

As described above, insertion of the crystal orientation layer in which 1 to 50 mol % of Ti, Ni, Co, Cu or Zn are added to Cr is more preferable since magnetic isolation of the magnetic grains in the magnetic layer and the perpendicular orientation improve.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A perpendicular magnetic recording medium comprising:
   a substrate;
   a nonmagnetic underlayer formed on the substrate, and containing at least one element selected from the group A consisting of Pt, Pd, Rh, Ag, Au and Ir, and at least one element or compound selected from the group B consisting of C, Ta, Mo, W, Nb, Zr, Hf, V, Mg, Al, Zn, Sn, In, Bi, Pb, Cd, $SiO_2$, MgO, $Al_2O_3$, TaC, TiC, TaN, TiN, $B_2O_3$, $ZrO_2$, $In_2O_3$ and $SnO_2$; and
   a magnetic layer formed directly on the underlayer, containing at least one element selected from the group consisting of Fe, Co and Ni, and at least one element selected from the group consisting of Pt, Pd, Au and Ir, and containing crystal grains having an $L1_0$ structure, wherein
   the medium further comprises a crystal orientation layer between the substrate and the underlayer, and wherein the crystal orientation layer contains Cr and at least one element selected from the group C consisting of Ti, Ni, Co, Cu and Zn.

2. The medium according to claim 1, wherein the crystal grains having the $L1_0$ structure in the magnetic layer are mainly {001}-oriented.

3. The medium according to claim 1, wherein crystal grains in the underlayer are mainly {100}-oriented.

4. The medium according to claim 1, wherein the underlayer contains at least one element or compound selected from the group B within a range from 0.1 mol % to 50 mol %.

5. The medium according to claim 1, wherein the magnetic layer contains at least one element or compound selected from the group B.

6. The medium according to claim 5, wherein the magnetic layer contains at least one element or compound selected from the group B within a range from 0.1 mol % to 40 mol %.

7. A medium according to claim 1, wherein the crystal orientation layer contains at least one element selected from the group C within a range from 0.1 mol % to 50 mol %.

8. The medium according to claim 1, further comprising a seed layer between the substrate and the crystal orientation layer.

9. The medium according to claim 1, wherein the magnetic layer has a thickness of 200 nm or less.

10. The medium according to claim 9, wherein the magnetic layer has a thickness ranging from 0.5 nm to 50 nm.

11. The medium according to claim 1, further comprising a protective layer on the magnetic layer.

* * * * *